(12) United States Patent
Horikawa et al.

(10) Patent No.: US 10,822,047 B2
(45) Date of Patent: Nov. 3, 2020

(54) SADDLE RIDING VEHICLE

(71) Applicant: HONDA MOTOR CO., LTD., Tokyo (JP)

(72) Inventors: Haruki Horikawa, Wako (JP); Naoki Serizawa, Asaka (JP); Tomohiko Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 16/098,328

(22) PCT Filed: Apr. 27, 2017

(86) PCT No.: PCT/JP2017/016823
§ 371 (c)(1),
(2) Date: Nov. 1, 2018

(87) PCT Pub. No.: WO2017/195643
PCT Pub. Date: Nov. 16, 2017

(65) Prior Publication Data
US 2019/0127014 A1    May 2, 2019

(30) Foreign Application Priority Data
May 11, 2016  (JP) .................. 2016-095561

(51) Int. Cl.
*B62K 23/02*  (2006.01)
*B62K 19/32*  (2006.01)
(Continued)

(52) U.S. Cl.
CPC .............. *B62K 23/02* (2013.01); *B62J 1/08* (2013.01); *B62J 17/00* (2013.01); *B62K 19/32* (2013.01);
(Continued)

(58) Field of Classification Search
CPC .. B62K 23/02; B62J 1/08; F02B 61/02; F02N 11/08; F02N 11/0803; F02N 11/0818
See application file for complete search history.

(56) References Cited

U.S. PATENT DOCUMENTS 4,917,061 A  *  4/1990  Nagakura ........... F02N 11/0803
                                                    123/179.3
2007/0245996 A1* 10/2007 Sasaki ................ F02N 11/0803
                                                    123/179.2
(Continued)

FOREIGN PATENT DOCUMENTS

EP    2824022 A1    1/2015
JP    61-077579     4/1986
(Continued)

OTHER PUBLICATIONS

International Search Report, dated Jun. 20, 2017 (dated Jun. 20, 2017), 2 pages.
(Continued)

*Primary Examiner* — Tony H Winner
(74) *Attorney, Agent, or Firm* — Rankin, Hill & Clark LLP

(57) ABSTRACT

A traveling vehicle provided with a starting device for starting a power generation part, the traveling vehicle being capable of restart the power generation part quickly. In a traveling vehicle including a power generation part mounted on a vehicle body, a starting device for starting the power generation part, and an operation part of the starting device, the operation part includes a handlebar side operation switch provided on a handlebar to permit a rider to steer the vehicle, and an auxiliary start switch provided on the vehicle body side, and the auxiliary start switch is disposed at an inner position of the vehicle body.

12 Claims, 12 Drawing Sheets

(51) Int. Cl.
    *B62J 1/08*      (2006.01)
    *F02N 11/08*     (2006.01)
    *F02B 61/02*     (2006.01)
    *F02N 15/00*     (2006.01)
    *B62J 17/00*     (2020.01)
    *B62J 23/00*     (2006.01)

(52) U.S. Cl.
    CPC .............. *F02B 61/02* (2013.01); *F02N 11/08* (2013.01); *F02N 15/00* (2013.01); *B62J 23/00* (2013.01)

(56) References Cited

U.S. PATENT DOCUMENTS

| | | | |
|---|---|---|---|
| 2008/0276891 A1* | 11/2008 | Kohls | F02N 3/04 123/179.24 |
| 2010/0032225 A1 | 2/2010 | Oohashi et al. | |
| 2010/0210417 A1 | 8/2010 | Lin et al. | |
| 2015/0207838 A1* | 7/2015 | Gabin | H04L 65/80 709/219 |
| 2015/0275838 A1 | 10/2015 | Tsusaka | |
| 2020/0025115 A1* | 1/2020 | Kondo | F02D 29/02 |

FOREIGN PATENT DOCUMENTS

| | | |
|---|---|---|
| JP | 2009-114941 | 5/2009 |
| JP | 2011-063195 | 3/2011 |
| JP | 2015-197048 | 11/2015 |

OTHER PUBLICATIONS

International Preliminary Report on Patentability dated Nov. 15, 2018, 6 pages.

European Search Report dated Apr. 8, 2019, 10 pages.

* cited by examiner

SADDLE RIDING VEHICLE

TECHNICAL FIELD

The present invention relates to a traveling vehicle.

BACKGROUND ART

There has been known a traveling vehicle including an operation part (start switch) for operating a starting device (stator motor) which starts a power generation part (engine) of a vehicle, and a kick start mechanism for starting the power generation part (for example, see Patent Literature 1). As disclosed in Patent Literature 1, the operation part is provided to a handlebar.

There has been disclosed an off-road race vehicle having a structure in which electric equipment such as a temperature sensor is disposed inside a shroud (for example, see Patent Literature 2). As disclosed in Patent Literature 2, a power generation part (engine) is started by a kick start mechanism.

CITATION LIST

Patent Literature

[Patent Literature 1]
Japanese Patent Laid-Open No. 2015-197048
[Patent Literature 2]
U.S. Patent Application Publication No. 2010/0032225

SUMMARY OF INVENTION

Technical Problem

In Patent Literature 1, the operation part for starting the power generation part is provided exposed on the handlebar, and thereby a favorable operability is obtained. However, when a vehicle travels on an off-road (rough terrain), for example, mud and the like adhere to the operation part, and the operation part is damaged, resulting in the operation part being difficult to operate, which may be time-consuming to restart the vehicle. Some vehicles can be restarted by the above-described kick start mechanism, whereas there have been increasing vehicles equipped only with the above-described operation part without providing the kick start mechanism for the purpose of weight reduction or the like.

The present invention has been made in view of the above circumstances, and an object of the present invention is to restart a power generation part quickly in a traveling vehicle provided with a starting device for starting the power generation part.

Solution to Problem

The present specification contains the whole content of Japanese Patent Application No. 2016-095561 filed on May 11, 2016.

In order to achieve the above object, an aspect of the present invention is directed to a traveling vehicle including a power generation part (10) mounted on a vehicle body (5), a starting device (80) for starting the power generation part (10), and an operation part of the starting device (80), wherein the operation part includes a handlebar side operation switch (67) provided on a handlebar (14) to permit a rider to steer the vehicle, and a vehicle body side operation switch (70, 270, 370) provided on the vehicle body (5) side, and the vehicle body side operation switch (70, 270, 370) is disposed at an inner position of the vehicle body (5).

According to the structure of the aspect of the present invention, the traveling vehicle includes the power generation part mounted on the vehicle body, the starting device for starting the power generation part, and the operation part of the starting device, the operation part includes the handlebar side operation switch provided on the handlebar to permit a rider to steer the vehicle, and the vehicle body side operation switch provided on the vehicle body side, and the vehicle body side operation switch is disposed at an inner position of the vehicle body. This enables the vehicle body side operation switch provided on the vehicle body side to be protected by the vehicle body, thereby capable of preventing mud and the like from adhering to the vehicle body side operation switch and preventing the vehicle body side operation switch from being externally damaged. Therefore, even when the handlebar side operation switch is difficult to operate, a rider can easily operate the vehicle body side operation switch to thereby restart the power generation part quickly. The rider can operate whichever of the handlebar side operation switch and the vehicle body side operation switch he/she can more easily operate in accordance with the conditions, so that the power generation part can be restarted quickly.

In the traveling vehicle according to the aspect of the present invention, the vehicle body (5) may have a cover member (50, 251, 50b), and the vehicle body side operation switch (70, 270, 370) may be disposed inside an outer surface portion of the cover member (50, 251, 50b) in a vehicle width direction, and be located in a vicinity of a seat (13) of the rider.

According to the structure of the aspect of the present invention, the vehicle body side operation switch is disposed inside the outer surface portion of the cover member of the vehicle body in the vehicle width direction, which enables the vehicle body side operation switch to be protected by the cover member. Furthermore, the vehicle body side operation switch is located in the vicinity of the seat of the rider, and accordingly the vehicle body side operation switch becomes close to the rider, so that the rider can operate the vehicle body side operation switch easily.

In the traveling vehicle according to the aspect of the present invention, the cover member (50) may be a shroud provided on a side of a cooling device (39) of the power generation part (10), and the vehicle body side operation switch (70) may be disposed in a rear-side opening (107) that is opened at a rear side of the shroud.

According to the structure of the aspect of the present invention, the body vehicle side operation switch is disposed in the rear-side opening that is opened at the rear side of the shroud provided on the side of the cooling device of the power generation part. This enables the rider to operate the vehicle body operation switch through the rear-side opening of the shroud, so that the operability is excellent. The vehicle body side operation switch can be protected by the cooling device and the shroud, which makes it difficult for dirt to adhere to the vehicle body side operation switch.

In the traveling vehicle of the aspect of the present invention, the vehicle body (5) may include a main frame (18) that extends rearward from a head pipe (17) turnably supporting the handlebar (14), a down frame (19) that extends below the main frame (18) toward a rear side of the head pipe (17), and a reinforcement frame (22) which connects between the down frame (19) and the main frame (18) in a front-rear direction, and the vehicle body side operation switch (70) may be attached to the reinforcement frame (22).

According to the structure of the aspect of the present invention, the vehicle body side operation switch is attached to the reinforcement frame that connects between the down frame and the main frame in the front-rear direction. This enables the vehicle body side operation switch to be attached by a simple structure, using the reinforcement frame without using a special bracket or the like.

In the traveling vehicle of the aspect of the present invention, the vehicle body (5) may include the main frame (18) that extends rearward from the head pipe (17) turnably supporting the handlebar (14), and a seat frame (25) that is disposed on a rear side of the main frame (18), and the vehicle body side operation switch (270) may be attached to the seat frame (25).

According to the structure of the aspect of the present invention, the vehicle body side operation switch is attached to the seat frame that is disposed on the rear side of the main frame. This enables the vehicle body side operation switch to be attached by a simple structure, using the seat frame without using a special bracket or the like.

In the traveling vehicle of the aspect of the present invention, the vehicle body (5) may include the cover member (50b) having an opening (320d) which is opened to a side of the cover member (50b), and the vehicle body side operation switch (370) may be disposed so as to be operable through the opening (320d).

According to the structure of the aspect of the present invention, the cover member of the vehicle body includes the opening to the side of the cover member, and the vehicle body side operation switch is disposed so as to be operable through the opening, which makes it difficult for mud and the like to adhere to the vehicle body side operation switch. The vehicle body side operation switch in the opening is hardly visible from the outside, so that the appearance is excellent.

In the traveling vehicle of the aspect of the present invention, the vehicle body side operation switch may include an operation element (100) to be operated by the rider, a main body (101, 211) holding the operation element (100), and an attachment (102, 202) to be attached to the vehicle body (5), and the operation element (100) may be attached so as to face downward.

According to the structure of the aspect of the present invention, the operation element of the vehicle body side operation switch is attached so as to face downward, thereby enabling the rider to easily operate the vehicle body side operation switch when the rider extends his/her hand to the vehicle body side operation switch from above.

In order to achieve the above object, an aspect of the present invention is directed to a traveling vehicle including a power generation part (10) mounted on a vehicle body (5), a starting device (80) for starting the power generation part (10), and an operation part of the starting device (80), wherein the operation part includes a handlebar side operation switch (67) provided on a handlebar (14) to permit a rider to steer the vehicle, and a vehicle body side operation switch (70, 270, 370) provided on the vehicle body (5) side.

According to the structure of the aspect of the present invention, the traveling vehicle includes the power generation part mounted on the vehicle body, the starting device for starting the power generation part, and the operation part of the starting device, the operation part includes the handlebar side operation switch provided on the handlebar to permit a rider to steer the vehicle, and the vehicle body operation switch provided on the vehicle body side. This enables the rider to operate whichever of the handlebar side operation switch and the vehicle body side operation switch he/she can more easily operate in accordance with the conditions, so that the power generation part can be restarted quickly.

In the traveling vehicle of the aspect of the present invention, the handlebar (14) may include a clutch operation element (64a) for engaging and disengaging transmission of driving force of the power generation part (10), and both of the clutch operation element (64a) and the vehicle body side operation switch (70, 270, 370) may be operable simultaneously by the rider.

According to the structure of the aspect of the present invention, the rider can operate both of the clutch operation element on the handlebar and the vehicle body side operation switch simultaneously, so that the rider operates both of the clutch operation element and the vehicle body side operation switch simultaneously when starting the power generation part, thereby enabling the power generation part to be easily started.

Furthermore, in the traveling vehicle of the aspect of the present invention, the clutch operation element (64a) and the vehicle body side operation switch (70, 270, 370) may be disposed separately on the left side and the right side of the vehicle body.

According to the structure of the aspect of the present invention, the clutch operation element and the vehicle body side operation switch are disposed separately on the left side and the right side of the vehicle body, and accordingly the rider can use his/her left and right hands to operate the clutch operation element and the vehicle body side operation switch, respectively, so that the operability is excellent.

In the traveling vehicle of the aspect of the present invention, the vehicle body side operation switch (70, 270, 370) may be disposed inside the cover member (50, 251, 50b) being an outer surface portion of the vehicle body (5) in the vehicle width direction.

According to the structure of the aspect of the present invention, the vehicle body side operation switch is disposed inside the cover member being the outer surface portion of the vehicle body in the vehicle width direction, so that the vehicle body side operation switch can be protected by the cover member, thereby capable of preventing mud and the like from adhering to the vehicle body side operation switch. Accordingly, the operability of the vehicle body side operation switch is excellent.

In the traveling vehicle of the aspect of the present invention, the vehicle body side operation switch (70, 270, 370) and the handlebar side operation switch (67) may be disposed at respective positions which the hands of the rider sitting on the seat (13) can reach.

According to the aspect of the present invention, the vehicle body side operation switch and the handlebar side operation switch are disposed at the respective positions which the hands of the rider sitting on the seat can reach, so that the operability of the vehicle body side operation switch and the handlebar side operation switch is excellent.

Advantageous Effects of Invention

In the traveling vehicle according to the aspect of the present invention, the vehicle body side operation switch can be easily operated to restart the power generation part quickly. The rider can operate whichever of the handlebar side operation switch and the vehicle body side operation switch he/she can more easily operate in accordance with the conditions, so that the power generation part can be restarted quickly.

In addition, the rider can easily operate the vehicle body side operation switch that is located inside the outer surface portion of the cover member in the vehicle width direction, and in the vicinity of the rider.

The rider can operate the vehicle body side operation switch through the rear-side opening of the shroud, so that the operability is excellent. Furthermore, the vehicle body side operation switch can be protected by the cooling device and the shroud.

The vehicle body side operation switch can be attached using the reinforcement frame by a simple structure.

The vehicle body side operation switch can be attached using the seat frame by a simple structure.

The vehicle body side operation switch is disposed so as to be operable through the opening, which makes it difficult for mud and the like to adhere to the vehicle body side operation switch and provides excellent appearance.

The rider can easily operate the vehicle body side operation switch when the rider extends his/her hand to the vehicle body side operation switch from above.

The rider operates both of the clutch operation element and the vehicle body side operation switch simultaneously, thereby enabling the power generation part to be easily started.

The rider can use his/her left and right hands to operate the clutch operation element and the vehicle body side operation switch, respectively, so that the operability is excellent.

The vehicle body side operation switch can be protected by the cover member, thereby capable of preventing mud and the like from adhering to the vehicle body side operation switch.

The hands of the rider sitting on the seat can reach the vehicle body side operation switch and the handlebar side operation switch, so that the operability is excellent.

DESCRIPTION OF EMBODIMENTS

Hereinafter, embodiments of the present invention will be described with reference to the accompanying drawings. Note that in the explanation, any description of directions such as front and rear, right and left, and upper and lower is the same as the direction relative to a vehicle body unless specifically described. Further, in each drawing, the symbol FR denotes a front direction of the vehicle body, the symbol UP denotes an upward direction of the vehicle body, and the symbol LH denotes a leftward direction of the vehicle body.

First Embodiment

Figure 1:
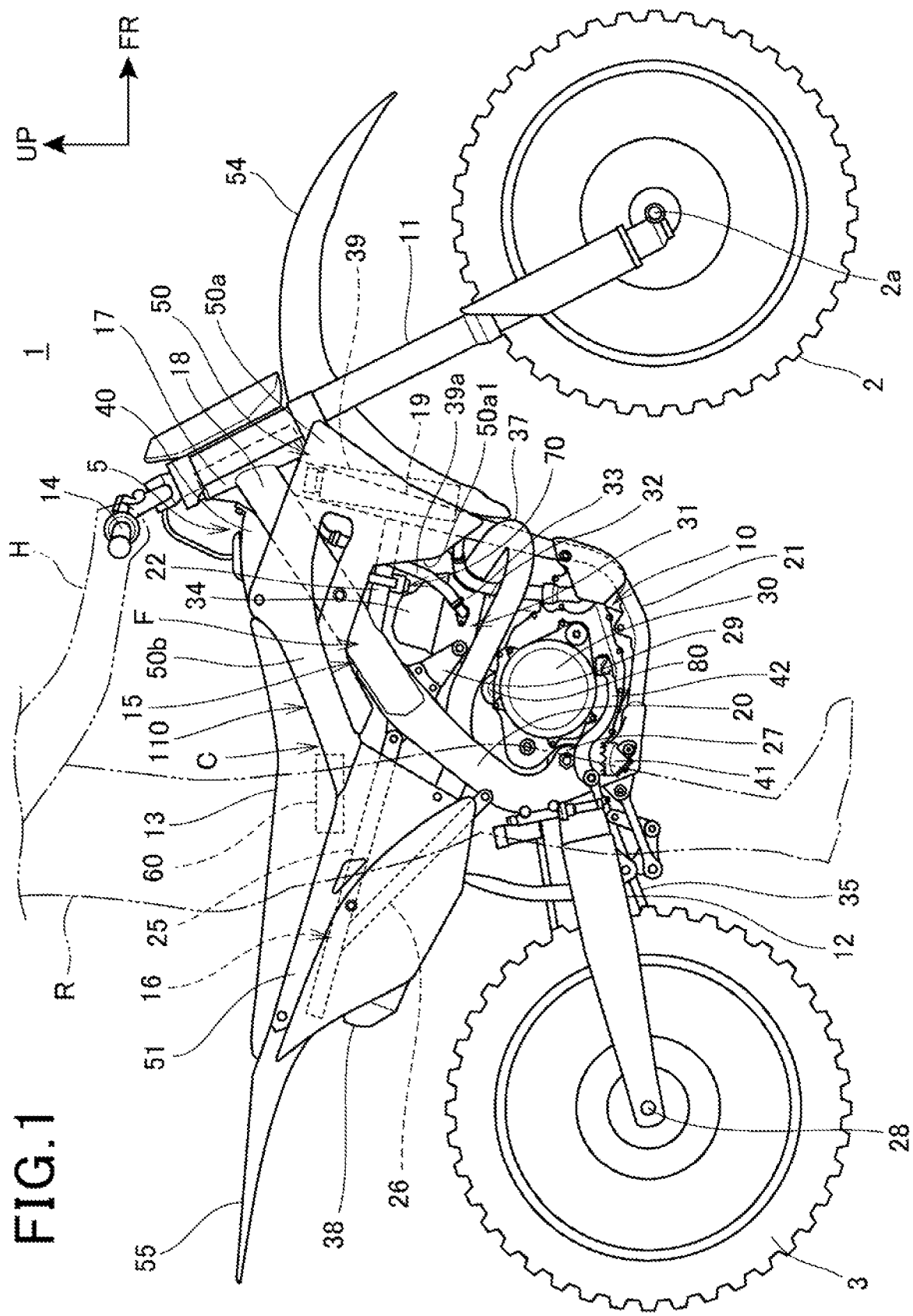
FIG. 1 is a right side view of a motorcycle of a first embodiment of the present invention.

FIG. 1 is a right side view of a motorcycle according to a first embodiment of the present invention. Note that, in the right side view in the following description, there are illustrated only those on the right side of components provided as pairs of left and right components.

A motorcycle 1 (traveling vehicle) is a vehicle in which an engine 10 (power generation part) as a power unit is supported on a vehicle body frame F, a front fork 11 that steerably supports a front wheel 2 is steerably supported at a front end of the vehicle body frame F, and a swing arm 12 that supports a rear wheel 3 is provided on a rear portion side of the vehicle body frame F. The motorcycle 1 is a saddle riding vehicle in which a seat 13 (seating portion) is provided above the rear portion of the vehicle body frame F, where a rider sits on the seat 13 in a manner to stride over the seat 13.

The motorcycle 1 is an all-terrain vehicle for competition that travels on a closed course, and does not include a key cylinder unit for turning on/off a main power supply of the motorcycle 1 and lighting devices and the like needed for the traveling on a general public road in order to achieve weight reduction.

The vehicle body frame F includes a front frame 15 that supports the engine 10 as an internal combustion engine and a rear frame 16 that extends rearward from the front frame 15.

The front frame 15 includes a head pipe 17 provided at a front end, a pair of left and right main frames 18, 18, a down frame 19, a pair of left and right center frames 20, 20, a pair of left and right lower frames 21, 21, and a pair of left and right reinforcement frames 22, 22.

Specifically, the pair of left and right main frames 18, 18 extend downward toward the rear from a rear surface of the head pipe 17. Front end portions of the left and right main frames 18, 18 extend rearward while widening a space therebetween in the vehicle width direction, and rear portions of the main frames 18, 18 extend rearward substantially in parallel with each other.

The down frame 19 has an upper end portion thereof connected to a rear portion of the head pipe 17 and front end portions of the main frames 18, 18 so as to be located at a position under the main frames 18, 18. The down frame 19 extends downward toward the rear at a steeper inclination than that of the main frames 18, 18. The down frame 19 is one frame extending in a center in the vehicle width direction.

The center frames 20, 20 extend downward toward the rear from rear ends of the main frames 18, 18 at a steeper inclination than that of the main frames 18, 18.

The lower frames 21, 21 branch leftward and rightward from a lower end portion of the down frame 19, and each extend downward, then bend and extend rearward, and are connected to lower end portions of the center frames 20, 20.

The reinforcement frames 22, 22 connect between the main frames 18, 18 and the down frame 19. The reinforcement frames 22, 22 extend slightly downward toward the front from lower surfaces of middle portions in the front and rear direction of the main frames 18, 18, and the front portions of the reinforcement frames 22, 22 bend inward in the vehicle width direction, and are connected to the rear surface of the upper portion of the down frame 19.

The rear frame 16 includes a pair of left and right seat frames 25, 25, and a pair of left and right sub-frames 26, 26.

The seat frames 25, 25 extend rearward in a position of being upward toward the rear from a position in proximity to upper end portions of the center frames 20, 20 in the rear portion of the front frame 15.

The sub-frames 26, 26 extend upward toward the rear from a position under the seat frames 25, 25 in the center frames 20, 20, and rear ends of the sub-frames 26, 26 are connected to the seat frames 25, 25.

The front fork 11 is turnably journaled to the head pipe 17 through a steering shaft (not illustrated) journaled to the head pipe 17. The front wheel 2 is journaled on a front wheel axle 2a provided at a lower end portion of the front fork 11. The handlebar 14 (handlebar part) used by the rider to steer the front wheel 2 is attached to a top end portion of the front fork 11.

The swing arm 12 has a front end portion journaled on a pivot shaft 27 that connects the left and right center frames 20, 20 in the vehicle width direction, and thus swings in the up-down direction about the pivot shaft 27. The rear wheel 3 is journaled on a rear wheel axle 28 that is passed through a rear end portion of the swing arm 12.

A rear suspension (not illustrated) is stretched between a front end portion of the swing arm 12 and the front frame 15.

The engine 10 is disposed inside the front frame 15 formed in a frame shape as viewed from the side, and is supported by the front frame 15. An engine hanger 29 extending forward is fixed to rear portions of the main frames 18, 18.

The engine 10 includes a crankcase 30 that supports a crankshaft (not illustrated) extending in the vehicle width direction, and a cylinder portion 31 that extends upward from a front portion of the crankcase 30. The crankcase 30 is located between a lower end portion of the down frame 19 and the center frames 20, 20 as viewed from the side.

The cylinder portion 31 includes, sequentially from the crankcase 30 side, a cylinder block 32, a cylinder head 33, and a head cover 34 that covers a valve mechanism in an upper surface portion of the cylinder head 33. The head cover 34 forming an upper end of the cylinder portion 31 is located between the rear portions of the main frames 18, 18 and the down frame 19 and below the reinforcement frames 22, 22, as viewed from the side. A front end portion of the engine hanger 29 is connected to a rear side surface of the cylinder head 33.

A starter motor 80 for rotating the crankshaft is provided on an upper portion of the crankcase 30. A transmission (not illustrated) is included in a rear portion of the crankcase 30, the transmission reducing the rotational speed of the above-described crankshaft to output the driving force to the rear wheel 3 side. A clutch (not illustrated) for engaging and disengaging transmission of the driving force of the above-described crankshaft to and from the transmission is provided in the crankcase 30.

The output of the engine 10 is transmitted to the rear wheel 3 by a chain 35 wound between an output shaft (not illustrated) of the transmission of the engine 10 and the rear wheel 3.

An exhaust pipe 37 of the engine 10 is drawn out forward from an exhaust port of a front surface of the cylinder portion 31, is bent into a U-shape and extends rearward, and then extends rearward while passing one side (right side) of the cylinder portion 31, so that a rear end of the exhaust pipe 37 is connected to a muffler 38 disposed behind the front frame 15. Specifically, the exhaust pipe 37 extends rearward whiling passing above the crankcase 30 and one side of the cylinder block 32.

The motorcycle 1 includes a pair of left and right plate-shaped radiators 39, 39 (cooling devices) that radiate the heat of cooling water of the engine 10. The radiators 39, 39 are disposed in front of the cylinder portion 31 so as to be separated from each other on the left and right sides of the down frame 19. The radiators 39, 39 are disposed upright such that heat radiating surfaces of the radiators 39, 39, the heat radiating surfaces being surfaces in a plate thickness direction, face the front side of the motorcycle 1.

A radiator hose 39a connecting between a radiator 39 and the cylinder head 33 extends downward toward the rear from an upper portion of the radiator 39, and is connected to one side surface of the cylinder head 33.

A fuel tank 40 is disposed between the head pipe 17 and the seat 13, and above the main frames 18, 18. The fuel tank 40 is supported by the main frames 18, 18.

The seat 13 extends rearward from a rear portion of the fuel tank 40 along an upper surface of the seat frames 25, 25. The seat 13 is supported by the seat frames 25, 25.

Steps 41, 41 on which the rider rests his/her feet are provided as a left-right pair to the lower end portions of the center frames 20, 20.

A rear wheel brake pedal 42 is provided in front of a step 41 on the right side (one side in the vehicle width direction), the brake pedal 42 being used for the rider to operate a brake device of the rear wheel 3.

The motorcycle 1 includes a vehicle body cover C made of resin that covers the vehicle body. The vehicle body cover C includes a pair of left and right shrouds 50, 50, and a pair of left and right rear side covers 51, 51.

Each of the shrouds 50 (cover members) integrally includes a shroud portion 50a that covers the radiator 39 and a front portion of the main frame 18 from the outside, and a side cover 50b that covers a portion between a rear portion of the main frame 18 and a front portion of the seat 13 from the outside.

Each of the rear side covers 51 is located below a rear portion of the seat 13, and covers the rear frame 16 and the muffler 38 from the outside.

The vehicle body frame F and the vehicle body cover C forms the vehicle body 5.

The motorcycle 1 includes a front fender 54 that is attached to the front fork 11 and covers the front wheel 2 from above, and a rear fender 55.

The motorcycle 1 includes a control unit 60 below the seat 13, the control unit 60 controlling the operation of the engine 10.

Figure 2:
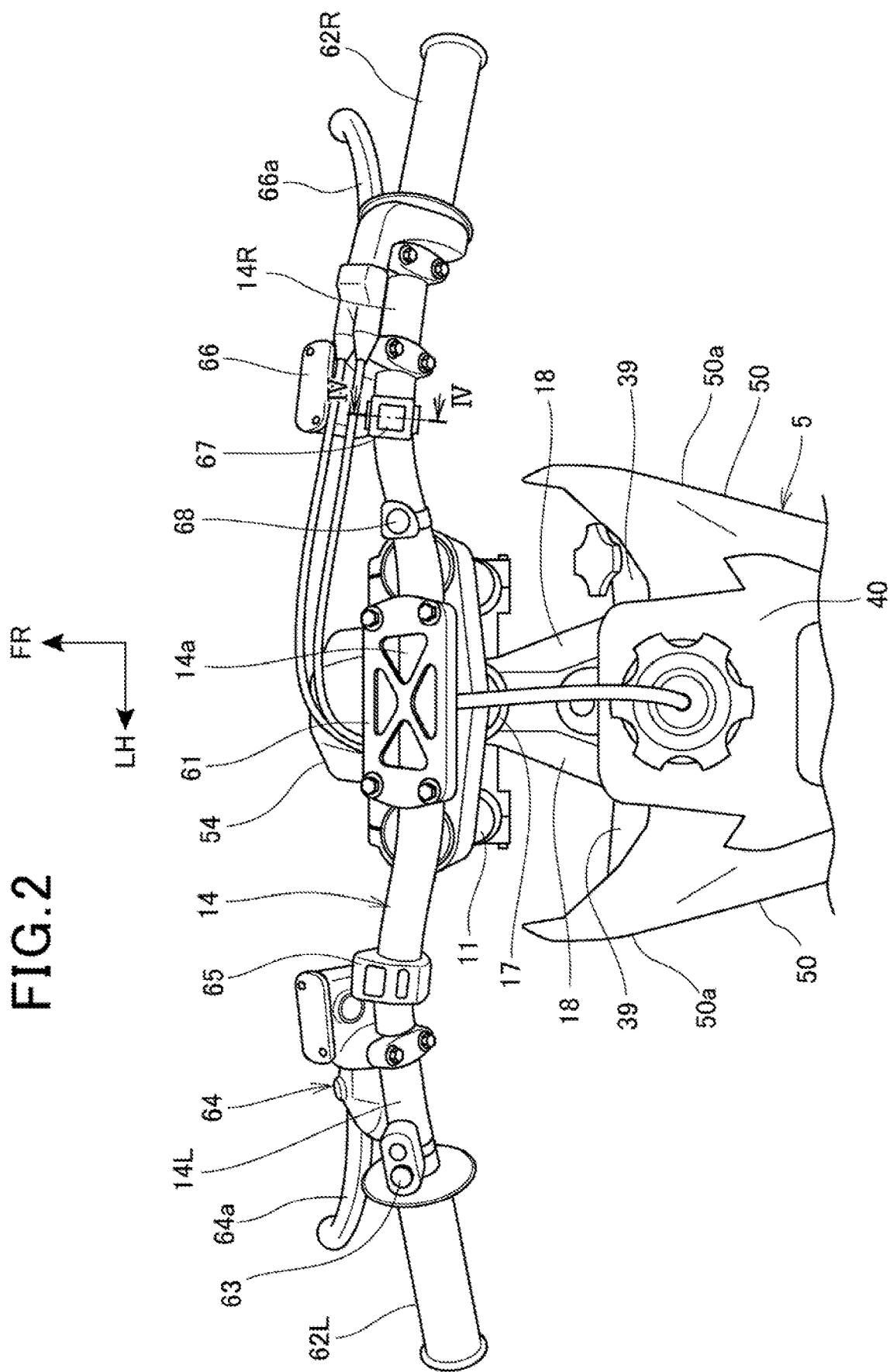
FIG. 2 is a view of a structure of a handlebar and a periphery thereof as viewed from above.

FIG. 2 is a view of a structure of the handlebar 14 and a periphery thereof as viewed from above.

The handlebar 14 is a single bar handle. The handlebar 14 integrally includes a center portion 14a that is fixed to the top end portion of the front fork 11 by a handlebar holder 61, a one-side handlebar portion 14R that extends toward one side (rightward) in the vehicle width direction from the center portion 14a, and an other-side handlebar portion 14L that extends toward the other side (leftward) in the vehicle width direction from the center portion 14a.

Outer end portions of the one-side handlebar portion 14R and the other-side handlebar portion 14L are provided with grips 62R, 62L that are held by the rider, respectively. The one-side grip 62R is an accelerator grip to be operated by the rider to control a throttle valve opening degree of an air intake device of the engine 10.

The other-side handlebar portion 14L is provided with an engine stop switch 63, a clutch operation portion 64 with a clutch lever 64a (clutch operation element), and a fuel injection mode operation portion 65, sequentially from the grip 62L side.

The clutch provided in the crankcase 30 operates in conjunction with the operation of the clutch lever 64a. When the rider operates the clutch lever 64a, the clutch is disconnected, so that the power of the engine 10 is not transmitted to the rear wheel 3 side.

The one-side handlebar portion 14R is provided with a brake operation portion 66 with a front wheel brake lever 66a, an engine start switch 67 (operation portion, handlebar side operation switch), and a start mode switch 68, sequentially from the grip 62R side. When the front wheel brake lever 66a is operated, the brake device of the front wheel 2 is activated.

The engine start switch 67 is a switch for driving the starter motor 80 (see FIG. 3) as a starting device to start the engine 10. The starter motor 80 is a starting device that is driven by electric power to drive the engine 10.

The engine start switch 67 and the clutch lever 64a are disposed so as to be separated from each other on the right and left sides, respectively, with respect to a center of the vehicle body 5 in the vehicle width direction.

The motorcycle 1 includes, as a switch for driving the starter motor 80 to start the engine 10, an auxiliary start switch 70 (operation part, vehicle body side operation switch, see FIG. 1) in addition to the engine start switch 67. As illustrated in FIG. 1, the auxiliary start switch 70 is attached to a reinforcement frame 22 on one side (right side) in the vehicle width direction.

Figure 3:
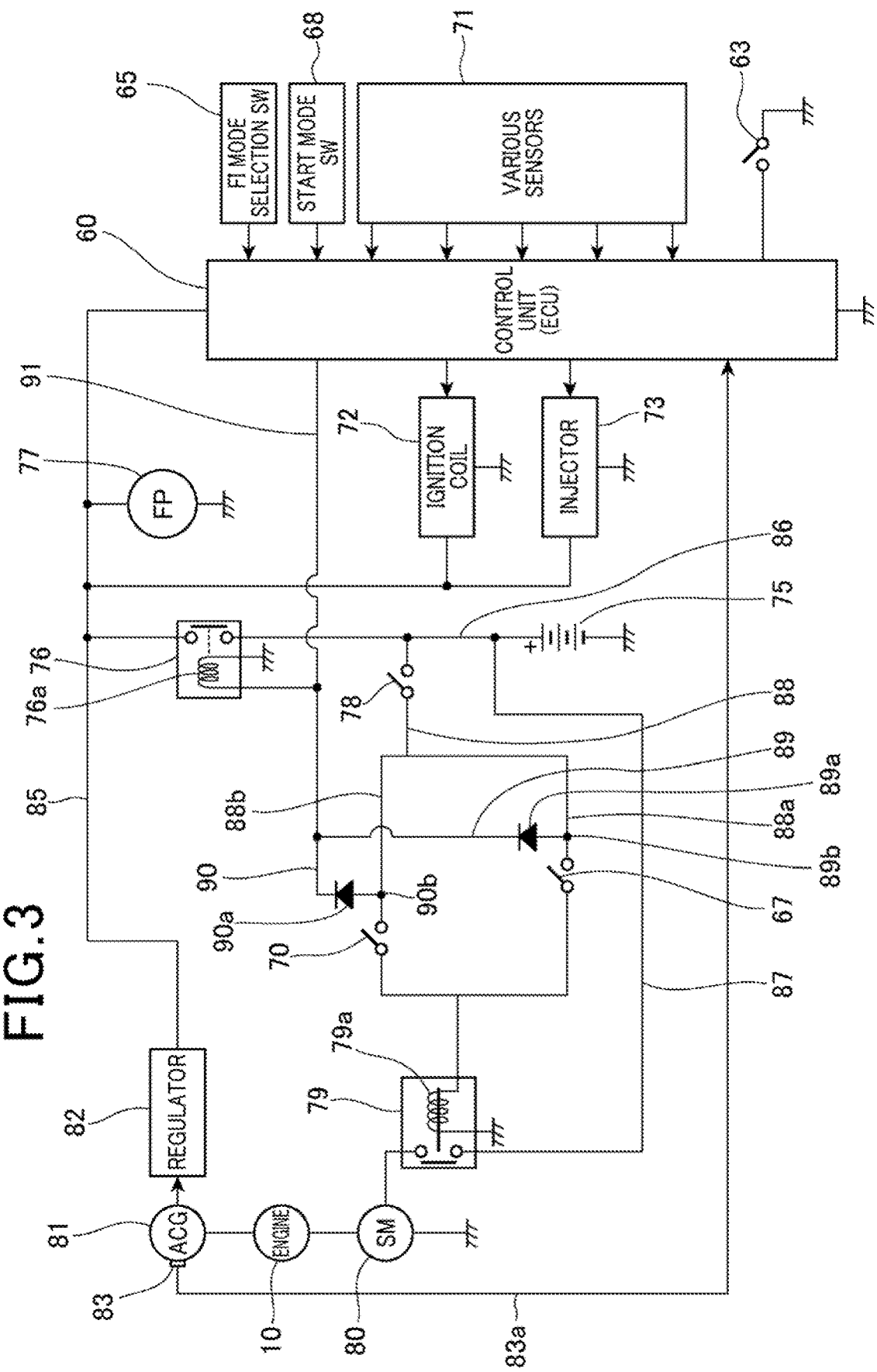
FIG. 3 is a diagram illustrating a configuration of an electricity supply circuit and a control unit and peripheries thereof in the motorcycle.

That is, each of the engine start switch 67 and the auxiliary start switch 70 serves as an operation part for operating the starter motor 80, and is a switch for switching between supply and cutoff of the electric power supplied to the starter motor 80 from a battery 75 (FIG. 3).

FIG. 3 is a diagram illustrating a configuration of an electricity supply circuit and the control unit 60 and peripheries thereof in the motorcycle 1.

The control unit 60 is an electronic control unit (ECU) that is formed by a microcontroller (CPU) and controls various parts of the motorcycle 1. The control unit 60 obtains information from various parts of the motorcycle 1, the information including operations of the rider, and the control unit 60 controls the operation of the engine 10 and the like based on the obtained information.

The control unit 60 has input ports connected with various kinds of sensors 71. Examples of various kinds of sensors include an intake air pressure sensor, and a throttle valve opening degree sensor.

The control unit 60 has also input ports connected with the engine stop switch 63, the fuel injection mode operation portion 65, and the start mode switch 68.

The control unit 60 has output ports connected with an ignition coil 72 for supplying a high voltage to an ignition plug of the engine 10, and an injector 73 for injecting fuel to an intake passage of the engine 10.

When the rider operates the engine stop switch 63 during operation of the engine 10, the control unit 60 stops ignition of the engine 10, and stops the engine 10.

The control unit 60 stores a plurality of fuel injection modes. When the rider operates the fuel injection mode operation part 65, the fuel injection mode is switched, and the output characteristics of the engine 10 are changed.

The control unit 60 stores a starting mode in which the ignition and fuel injection suitable at the time of starting the motorcycle 1 are performed. When the rider operates the start mode switch 68, the control unit 60 controls the engine 10 in the starting mode.

The electricity supply circuit of the motorcycle 1 includes the battery 75, a main relay 76, a fuel pump 77, a clutch switch 78, the engine start switch 67, the auxiliary start switch 70, a starter magnet 79, the starter motor 80 (starting device), the engine 10, a generator 81, a regulator 82, and a pulse generator 83.

The main relay 76 has a function corresponding to that of a main switch of the motorcycle 1.

The fuel pump 77 is driven by a power supply to supply fuel to the injector 73.

The clutch switch 78 is a switch operatively associated with the operation of the clutch lever 64a. The clutch switch 78 is on (in a conducting state in which the contact is closed) when the clutch lever 64a is gripped and operated.

The engine start switch 67 is on (in a conducting state in which the contact is closed) when the engine start switch 67 is operated by the rider.

The auxiliary start switch 70 is on (in a conducting state in which the contact is closed) when the auxiliary start switch 70 is operated by the rider.

The starter magnet 79 is on (in a conducting state in which the contact is closed) when the electric power of the battery 75 is supplied to a coil 79a.

The starter motor 80 is driven by the electric power of the battery 75 to rotate the crankshaft and start the engine 10.

The generator 81 is provided to the crankshaft, and is driven by the power of the engine 10 to generate the electric power.

The regulator 82 converts the electric power generated from the generator 81 into direct-current power of a voltage appropriate for being supplied to loads of the various parts of the motorcycle 1 and charging the battery 75.

The pulse generator 83 disposed in the vicinity of the generator 81 generates a pulse signal according to the rotation of a rotor of the generator 81. This pulse signal is input to the control unit 60 through a pulse transmission line 83a, and is used to detect the engine speed or the like.

The electricity supply circuit of the motorcycle 1 includes a power supply line 85 connecting between the regulator 82 and the control unit 60, a battery connection line 86 connecting between the battery 75 and the power supply line 85, a starting power supply line 87 connecting between the battery 75 and the starter motor 80, and a stating operation line 88 connecting between the battery 75 and the coil 79a of the starter magnet 79.

The main relay 76 is provided in the battery connection line 86. The fuel pump 77 is provided between the main relay 76 and the control unit 60 in the power supply line 85.

The clutch switch 78 is provided in the starting operation line 88. The starting operation line 88 includes a starting operation input line 88a and an auxiliary starting operation input line 88b that are provided in parallel between the clutch switch 78 and the starter magnet 79.

The engine start switch 67 is provided in the starting operation input line 88a. The auxiliary start switch 70 is provided in the auxiliary starting operation input line 88b.

The starting operation input line 88a is connected to the main relay 76 through a relay connection line 89 connecting between a contact 89b that is located between the engine start switch 67 and the clutch switch 78 in the starting operation input line 88a and the coil 76a of the main relay 76. The relay connection line 89 is provided with a diode 89a allowing only current to flow from the starting operation line 88 to the main relay 76 side.

The auxiliary starting operation input line 88b is connected to the coil 76a of the main relay 76 through an auxiliary connection line 90 connecting between a contact 90b that is located between the auxiliary start switch 70 and the clutch switch 78 in the auxiliary starting operation input line 88b and the relay connection line 89. The auxiliary connection line 90 is provided with an auxiliary side diode 90a allowing only current to flow from the starting operation line 88 to the main relay 76 side.

The output port of the control unit 60 is connected to the coil 76a of the main relay 76 through a relay control line 91 connecting between the control unit 60 and the relay connection line 90.

A procedure for starting the engine 10 by drive of the starter motor 80 will be described.

The rider who sits on the seat 13 operates the clutch lever 64a (FIG. 2) of the other-side handlebar portion 14L with his/her left hand. This operation turns on the clutch switch 78 operatively associated with the operation of the clutch lever 64a, so that the electric power of the battery 75 is supplied the coil 76a of the main relay 76 through the starting operation line 88, the relay connection line 89 and the auxiliary connection line 90. Hereby, the contact of the main relay 76 is closed to set the main relay 76 in a conducting state. In other words, the main relay 76 is in the on-state while the rider is gripping the clutch lever 64a.

When the main relay 76 is set in the conducting state, the electric power of the battery 75 is supplied from the battery connection line 86 to the power supply line 85, and the electric power of the battery 75 is supplied to various parts such as the fuel pump 77 and the control unit 60. Hereby, the motorcycle 1 results in a starting preparatory state in which the engine 10 can be started. The electric power can be supplied from the control unit 60 to the coil 76a of the main relay 76 through the relay control line 91, so that the control unit 60 can control the conducting state of the main relay 76. When the clutch lever 64a is operated, the fuel pump 77 is driven, and accordingly the preparation for fuel supply can be made quickly, which enables the engine 10 to be started quickly.

Next, when the rider operates, with his/her right hand, the engine start switch 67 of the one-side handlebar portion 14R or the auxiliary start switch 70 attached to the reinforcement frame 22 on one side in the vehicle width direction with the rider gripping the clutch lever 64a with his/her left hand, thereby capable of starting the engine 10.

Specifically, when the engine start switch 67 is operated (turned on), the engine start switch 67 is set in the conducting state, and the electric power of the battery 75 is supplied to the coil 79a of the starter magnet 79 through the starting operation input line 88a of the starting operation line 88. Hereby, the contact of the starter magnet 79 is closed to set the starter magnet 79 in a conducting state, and accordingly the electric power of the battery 75 is supplied to the starter motor 80 through the starting power supply line 87, so that the starter motor 80 is driven to start the engine 10.

When not the engine start switch 67 but the auxiliary start switch 70 is operated (turned on), the auxiliary start switch 70 is set in the conducting state, and the electric power of the battery 75 is supplied to the coil 79a of the starter magnet 79 through the auxiliary starting operation input line 88b of the starting operation line 88. Hereby, the contact of the starter magnet 79 is closed to set the starter magnet 79 in a conducting state, and accordingly the electric power of the battery 75 is supplied to the starter motor 80 through the starting power supply line 87, so that the starter motor 80 is driven to start the engine 10.

In the present embodiment, the starter motor 80 is not driven even if the engine start switch 67 or the auxiliary start switch 70 is operated, except when the clutch lever 64a is operated to set the clutch in the disconnecting state. Hereby, the starter motor 80 can be prevented from being driven when the clutch is in the connecting state.

After the engine 10 is started, the electric power generated from the generator 81 is supplied to various loads including the fuel pump 77, the control unit 60, the ignition coil 72, the injector 73, and the like through the power supply line 85. Furthermore, the battery 75 is charged by the generated electric power supplied through the battery connection line 86.

When the engine 10 is in the operating state, the control unit 60 sets the main relay 76 in the conducting state through the relay control line 91. Hereby, after the engine 10 is started, the main relay 76 can be maintained in the conducting state regardless of the operating condition of the clutch lever 64a.

Figure 4:
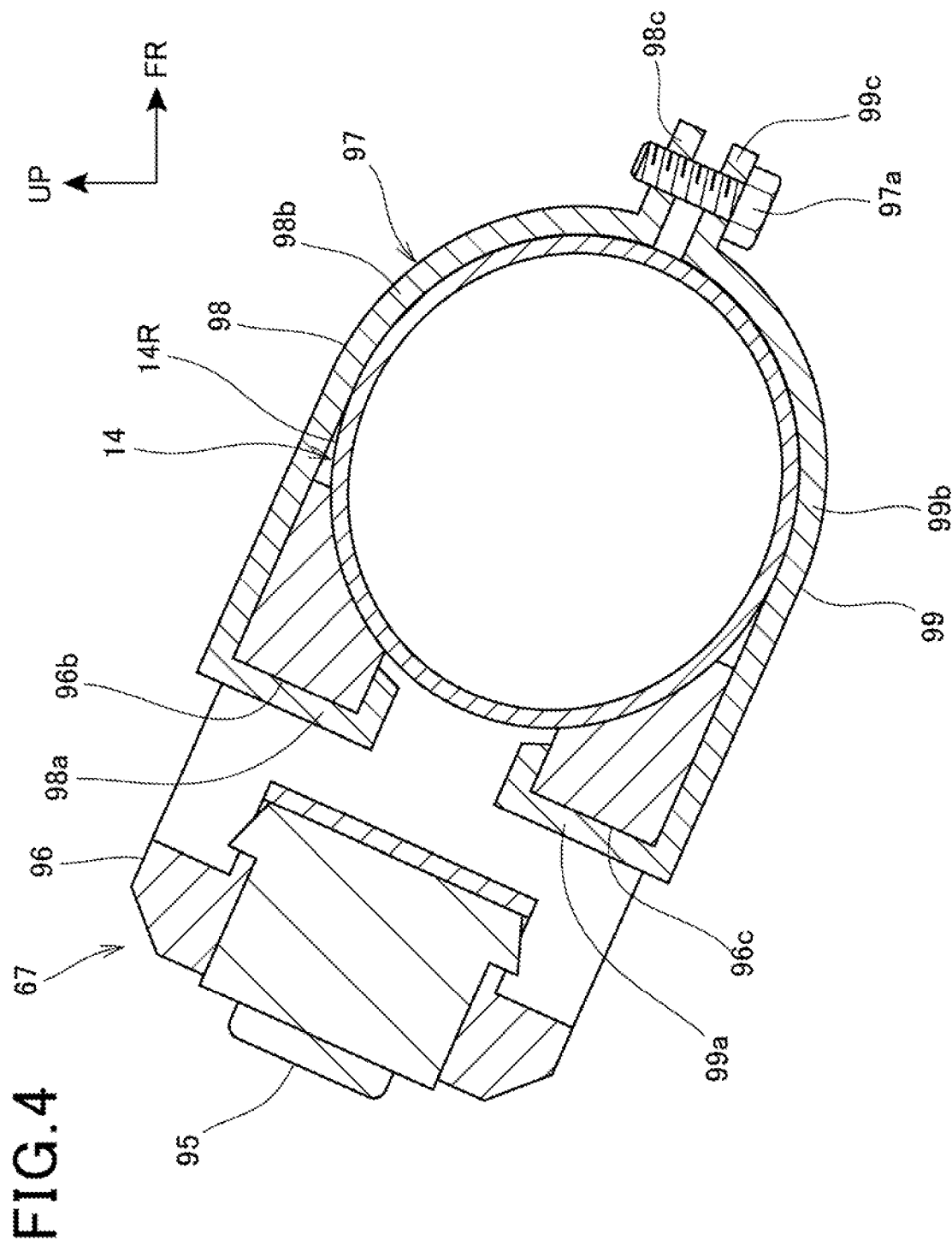
FIG. 4 is a cross-sectional view taken along line IV-IV of FIG. 2.

FIG. 4 is a cross-sectional view taken along line IV-IV of FIG. 2.

Referring now to FIG. 2 and FIG. 4, the engine start switch 67 includes a start switch operation element 95 to be pressed by the rider, a start switch main body 96 holding the start switch operation element 95, and a start switch fixture 97 fixing the start switch main body 96 to the one-side handlebar portion 14R.

The start switch main body 96 is formed in a substantially box shape, and is provided with the start switch operation element 95 on a rear surface of the start switch main body 96 facing the rider. The start switch main body 96 has a front surface 96a that is in contact with and is fixed to a rear surface of the one-side handlebar portion 14R having a circular cross sectional shape, and the front surface 96a is recessed in a circular-arc shape along an outer periphery of the one-side handlebar portion 14R.

The start switch main body 96 has openings 96b, 96c for engaging with the start switch fixture 97, the openings 96b, 96c being provided in the upper surface and the lower surface of the start switch main body 96, respectively.

The start switch operation element 95 is a press button that is to be pressed, and the engine start switch (FIG. 3) is in the conducting state only while the start switch operation element 95 is pressed by the rider.

The start switch fixture 97 includes an upper band 98 provided on an upper surface side of the start switch main body 96, a lower band 99 provided on a lower surface side of the start switch main body 96, and a fixing bolt 97a by which front ends of the upper band 98 and the lower band 99 are connected to one another.

The upper band 98 includes a claw portion 98a engaged into the opening 96b in the upper surface, a band portion 98b extending forward along the upper surface of the start switch main body 96 and the upper surface of the one-side handlebar portion 14R from the claw portion 98a, and a flange portion 98c being bent and extending forward from the front end of the band portion 98b.

The lower band 99 includes a claw portion 99a engaged into the opening 96c in the lower surface, a band portion 99b extending forward along the lower surface of the start switch main body 96 and the lower surface of the one-side handlebar portion 14R from the claw portion 99a, and a flange portion 99c being bent and extending forward from the front end of the band portion 99b.

The front portions of the band portions 98b, 99b are formed in a circular-arc shape along the outer periphery of the front portion of the one-side handlebar portion 14R.

The engine start switch 67 is fixed so as to hold the start switch main body 96 and the one-side handlebar portion 14R by a tightening force of the start switch fixture 97 generated by fastening the flange portions 98c, 99c with the fixing bolt 97a.

Figure 5:
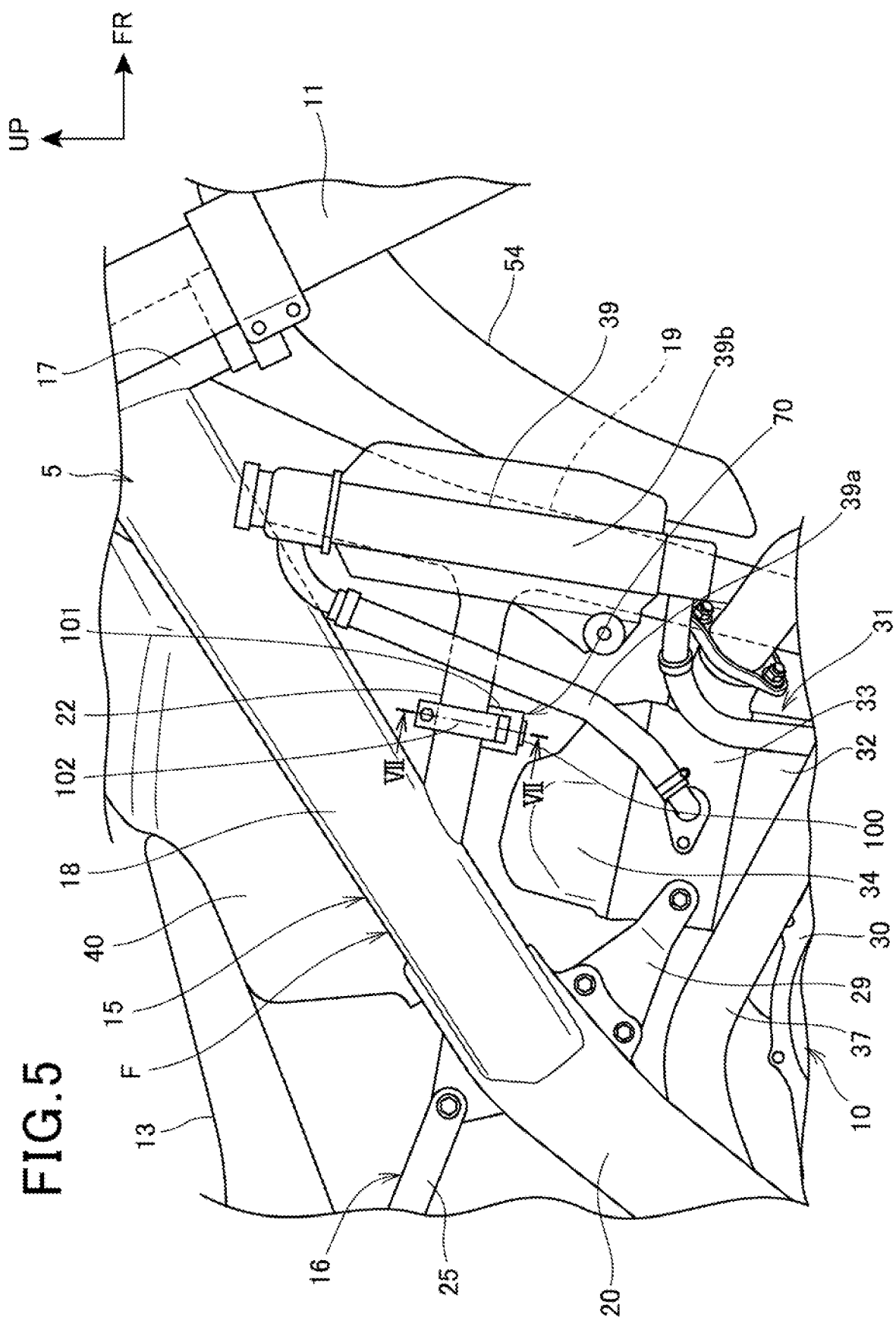
FIG. 5 is a right side view illustrating a state in which an auxiliary start switch is attached with a shroud removed.
Figure 6:
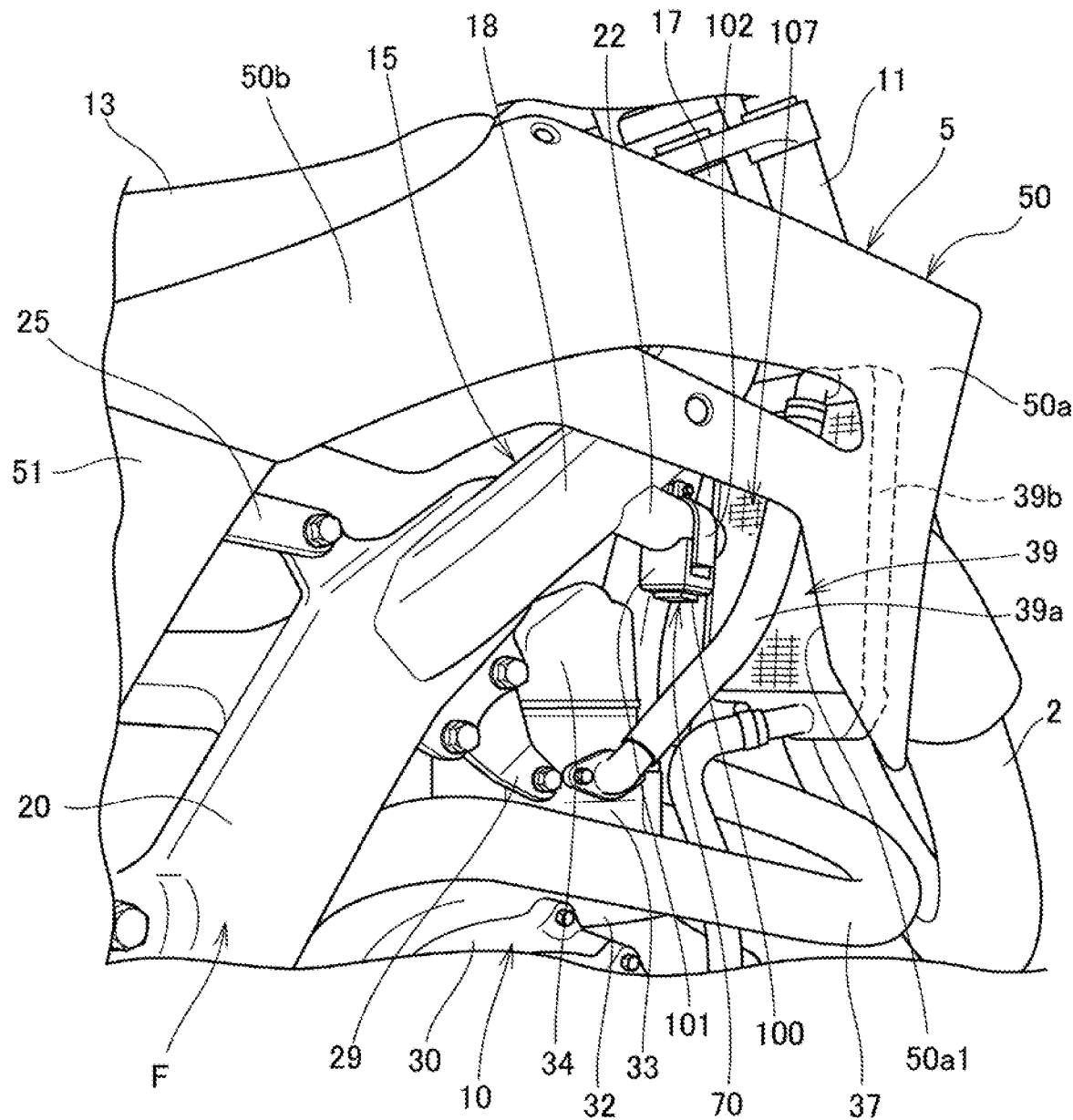
FIG. 6 is a perspective view of the auxiliary start switch and a periphery thereof as viewed from a rear right viewpoint.
Figure 7:
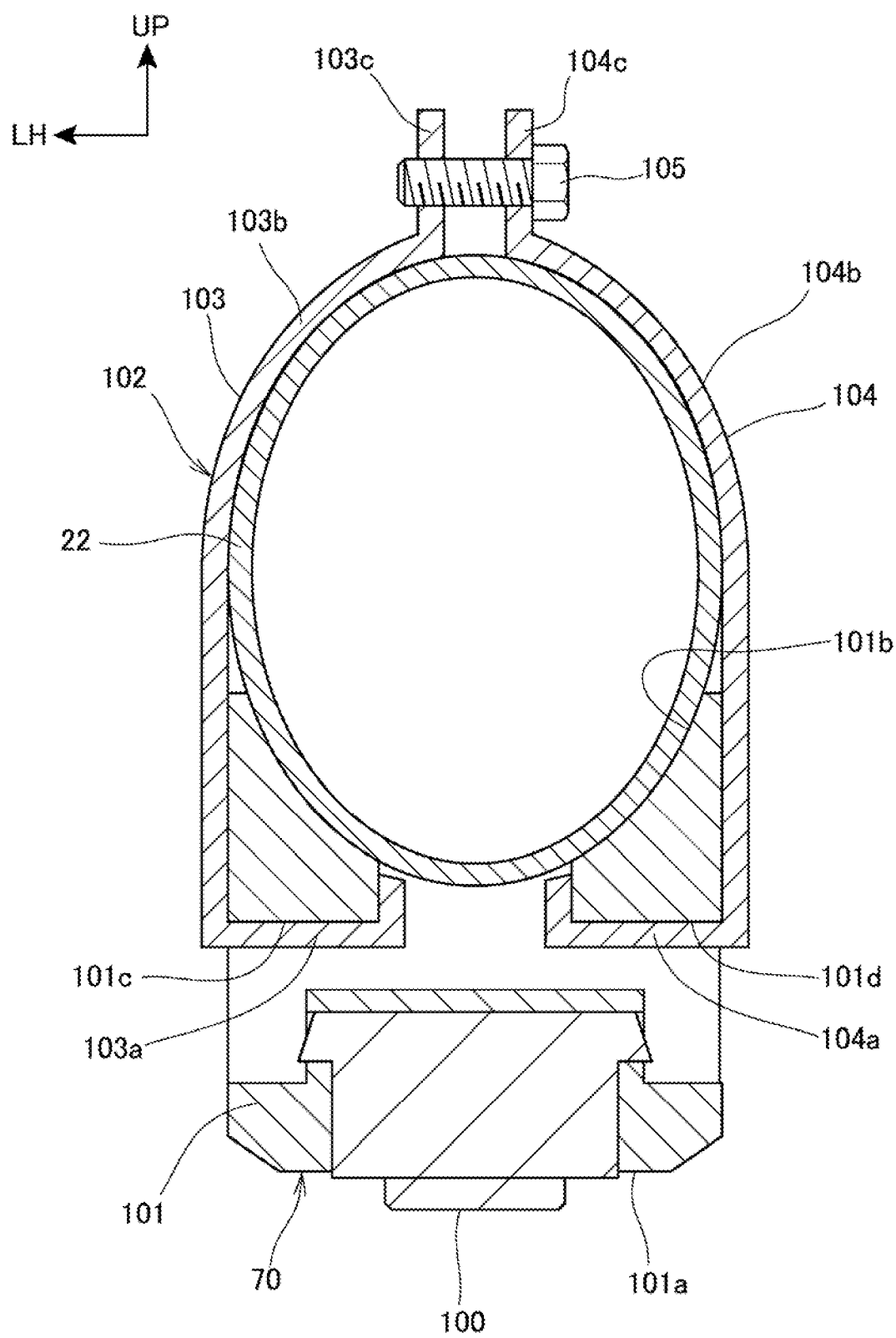
FIG. 7 is a cross-sectional view taken along line VII-VII of FIG. 5.

FIG. 5 is a right side view illustrating a state in which the auxiliary start switch 70 is attached with the shroud 50 removed. FIG. 6 is a perspective view of the auxiliary start switch 70 and the periphery thereof as viewed from a rear right viewpoint. FIG. 7 is a cross-sectional view taken along line VII-VII of FIG. 5.

Referring now to FIG. 1, and FIGS. 5 to 7, the auxiliary start switch 70 is attached to a lower surface of the reinforcement frame 22 on one side (right side) in the vehicle width direction. That is, the auxiliary start switch 70 is a vehicle body side operation switch that is attached to the vehicle body 5.

The reinforcement frame 22 is a pipe having a cross section formed in an elliptical shape that is long in the up-down direction.

The auxiliary start switch 70 includes an operation element 100 to be pressed by the rider, a main body 101 holding the operation element 100, and an attachment 102 fixing the main body 101 to the reinforcement frame 22.

As illustrated in FIG. 7, the main body 101 is formed in a substantially box shape, and is provided with an operation element 100 in a lower surface 101a of the main body 101. The main body 101 has an upper surface 101b that is in contact with and is fixed to the lower surface of the reinforcement frame 22 having a cross section formed in a substantially elliptical shape, and the upper surface 101b is recessed in a circular-arc shape along an outer periphery of the reinforcement frame 22.

The main body 101 has side openings 101c, 101d for engaging with the attachment 102, the side openings 101c, 101d being provided in an inner side surface and an outer side surface of the main body 101, respectively, in the vehicle width direction.

The operation element 100 is a press button that is to be pressed, and the auxiliary start switch 70 (FIG. 3) is in the conducting state only while the operation element 100 is pressed by the rider. The operation element 100 faces downward, and accordingly is pressed in an upward direction.

The attachment 102 is a fixture including an inner band 103 provided on an inner side surface of the main body 101 in the vehicle width direction, an outer band 104 provided on an outer side surface of the main body 101 in the vehicle width direction, and a fixing bolt 105 by which upper ends of the inner band 103 and the outer band 104 are connected to one another.

The inner band 103 includes a claw portion 103a engaged into the side opening 101c in the inner side surface, a band portion 103b extending upward along the inner side surface of the main body 101 and the upper inner side surface of the reinforcement frame 22 from the claw portion 103a, and a flange portion 103c being bent and extending upward from the upper end of the band portion 103b.

The outer band 104 includes a claw portion 104a engaged into the side opening 101d in the outer side surface, a band portion 104b extending upward along the outer side surface of the main body 101 and the upper outer side surface of the reinforcement frame 22 from the claw portion 104a, and a flange portion 104c being bent and extending upward from the upper end of the band portion 104b.

The upper portions of the band portions 103b, 104b are formed in a circular-arc shape along the outer periphery of the upper portion of the reinforcement frame 22.

The auxiliary start switch 70 is fixed so as to hold the main body 101 and the reinforcement frame 22 by a tightening force of the attachment 102 generated by fastening the flange portions 103c, 104c with a fixing bolt 105.

Referring now to FIG. 1, and FIGS. 5 and 6, the reinforcement frame 22 is located inside an outer side surface 39b of the radiator 39 extending outward from the down frame 19 in the vehicle width direction. The shroud portion 50a of the shroud 50 is further provided so as to cover an outer side surface 39b of the radiator 39 from the outside. That is, the reinforcement frame 22 is located inside the shroud portion 50a in the vehicle width direction, and the auxiliary start switch 70 provided on the lower surface of the reinforcement frame 22 is also located at an inner position with respect to the shroud portion 50a in the vehicle width direction.

The shroud portion 50a is a cover member forming an outer surface portion of a front portion of the vehicle body 5 in the vehicle width direction. A traveling wind from a front side of the motorcycle 1 flows between the shroud portion 50a and the down frame 19, passes through the radiator 39 to cool cooling water, and then is discharged to the rear of the shroud portion 50a. That is, the shroud portion 50a rectifies the traveling wind so that the traveling wind flows through the radiator 39.

Thus, the auxiliary start switch 70 is provided inside the outer surface portion of the shroud portion 50a in the inner position of the vehicle body 5 in the vehicle width direction (vehicle body width direction), so that the shroud portion 50a can protect the auxiliary start switch 70 from mud or external forces. Even if the motorcycle 1 fell on the ground, for example, the shroud portion 50a disposed outside the auxiliary start switch 70 is first in contact with the ground, thereby capable of preventing mud from adhering to the auxiliary start switch 70 and preventing the auxiliary start switch 70 from being damaged. Thus, when the auxiliary start switch 70 is operated to start the engine 10, the engine 10 can be easily restarted without the mud adhesion and damage interfering with the operation of the auxiliary start switch 70.

Even when the adhesion of the mud and the like to the engine start switch 67 makes it difficult for the rider to operate the engine start switch 67, the rider can operate the auxiliary start switch 70 to restart the engine 1 quickly.

The main body 101 of the auxiliary start switch 70 is located behind the down frame 19 and the radiator 39 and in front of the rear portion of the main frame 18 in the front-rear direction, and is disposed so as to be located between the head cover 34 and the reinforcement frame 22 in a side view. The main body 101 is located behind the radiator hose 39a and in front of the engine hanger 29.

Further, the main body 101 is located behind a rear edge 50a1 of the shroud portion 50a, and is exposed outward in a side view.

A rear-side opening 107 (FIG. 6) in which a space inside the shroud portion 50a in the vehicle width direction is opened toward the rear is formed among the rear edge 50a1 of the shroud portion 50a, the front frame 15, and the cylinder portion 31. The main body 101 is located in the rear-side opening 107 as viewed from the rear side.

The rider can easily operate the auxiliary start switch 70 by extending his/her hand from the outside of the vehicle body 5, using the space of the rear-side opening 107.

The main body 101 is located between the reinforcement frame 22 and the cylinder head 33 below the rear edge 50a1 of the shroud portion 50a, and is located above the radiator hose 39a and the exhaust pipe 37, in the up-down direction.

As illustrated in FIG. 1, for example, a rider R who attempts to start the engine 10 sits on a middle portion in the front and rear direction of the seat 13 disposed above the step 41, extends his/her legs downward substantially straightly, and touches his/her feet on the ground to support the motorcycle 1. Alternatively, the rider can place one foot on the step 41. In this state, the rider R operates the clutch lever 64a (FIG. 2) with his/her left hand, and operates the engine start switch (FIG. 2) or the auxiliary start switch 70 with his/her right hand H.

The engine start switch 67 and the auxiliary start switch 70 are within reach of the right hand H of the rider R who is sitting on the seat 13. Note that the reach of the hand of the rider R is expanded by bending the upper body of the rider even in a state in which the rider is sitting on the seat 13.

Specifically, the engine start switch 67 is provided on the handlebar 14 to permit the rider to steer the motorcycle 1, so that the right hand H of the rider R can easily reach the engine start switch 67. The auxiliary start switch 70 is provided in the vicinity of the shroud 50 continuously connected with the seat 13, so that the right hand H of the rider sitting on the seat 13 easily reaches the auxiliary start switch 70. Accordingly, the operability of the engine start switch 67 and the auxiliary start switch 70 is excellent. The auxiliary start switch 70 is located below the one-side handlebar portion 14R, and accordingly the right hand H can be easily moved from the one-side handlebar portion 14R to the auxiliary start switch 70, which enables the auxiliary start switch 70 to be operated quickly.

The engine start switch 67 and the auxiliary start switch 70 are provided on the same side in the vehicle width direction, so that the operability is excellent.

The operation element 100 of the auxiliary start switch 70 is provided so as to face downward, and accordingly the rider R sitting on the seat 13 can operate the operation element 100 by inserting his/her fingers below the operation element 100 when extending his/her right hand H downward to operate the operation element 100, so that the operability is excellent. In addition, the operation element 100 is provided to face downward, thereby enabling the operation element 100 to be prevented from being erroneously operated due to accidental touch with the operation element 100 from the outside.

When the motorcycle 1 is stopped, the legs of the rider are located behind the auxiliary start switch 70, and accordingly the legs do not interfere with the operation of the auxiliary start switch 70, which enables the auxiliary start switch 70 to be easily operated.

In the vehicle body 5, a portion from a front portion of a rear side cover 51 to the shroud portion 50a in the front-rear direction is a knee grip portion 110 being sandwiched and held between the leg portions including knees by the rider R while driving the motorcycle 1. Note that the rider R changes a riding position in the front-rear direction according to the driving conditions, and therefore the knee grip portion 110 is extended in a wide region in the front-rear direction.

The auxiliary start switch 70 is provided in the region of the knee grip portion 110. While driving the motorcycle 1, the legs of the rider R overlap with the auxiliary start switch 70 as viewed from the outside, thereby capable of preventing mud and the like from adhering to the auxiliary start switch 70 and preventing the auxiliary start switch 70 from being damaged.

As described above, according to the first embodiment to which the present invention is applied, the motorcycle 1 includes the engine 10 mounted on the vehicle body 5, the starter motor 80 for starting the engine 10, and the operation part of the starter motor 80, wherein the operation part includes the engine start switch 67 provided on the handlebar 14 to permit a rider to steer the motorcycle 1, and the auxiliary start switch 70 provided on the vehicle body 5 side, and the auxiliary start switch 70 is disposed at an inner position of the vehicle body 5. This enables the auxiliary start switch 70 provided on the vehicle body 5 side to be protected by the vehicle body 5, thereby capable of preventing mud and the like from adhering to the auxiliary start switch 70 and preventing the auxiliary start switch 70 from being damaged due to external impact and the like. Therefore, even when the engine start switch 67 is difficult to operate, a rider can easily operate the auxiliary start switch 70 to thereby restart the engine 10 quickly. The rider can operate whichever of the engine start switch 67 and the auxiliary start switch 70 he/she can more easily operate in accordance with the conditions, so that the engine 10 can be restarted quickly.

The auxiliary start switch 70 is disposed inside the outer surface portion of the shroud 50 of the vehicle body 5 in the vehicle width direction, which enables the auxiliary start switch 70 to be protected by the shroud 50. Furthermore, the auxiliary start switch 70 is located in the vicinity of the seat 13 on which the rider sits, and accordingly the auxiliary start switch 70 becomes close to the rider, so that the rider can operate the auxiliary start switch 70 easily. Note that as long as the auxiliary start switch 70 is disposed inside the outer surface portion of the shroud 50 as a cover member of the vehicle body 5 in a vehicle width direction, the auxiliary start switch 70 is not necessarily covered by the shroud 50, and for example, the auxiliary start switch 70 may be exposed outward in a side view.

The shroud 50 is provided on a side of the radiator 39 of the engine 10, and the auxiliary start switch 70 is disposed in the rear-side opening 107 that is opened at a rear side of the shroud 50. This enables the rider to operate the auxiliary start switch 70 through the rear-side opening 107 of the shroud 50, so that the operability is excellent. The auxiliary start switch 70 can be protected by the radiator 39 and the shroud 50, which makes it difficult for dirt to adhere to the auxiliary start switch 70.

The vehicle body 5 includes the main frame 18 that extends rearward from the head pipe 17 turnably supporting the handlebar 14, the down frame 19 that extends below the main frame 18 toward a rear side of the head pipe 17, and the reinforcement frame 22 which connects between the down frame 19 and the main frame 18 in a front-rear direction, and the auxiliary start switch 70 is attached to the reinforcement frame 22. This enables the auxiliary start switch 70 to be attached by a simple structure, using the reinforcement frame 22 without using a special bracket or the like.

The auxiliary start switch 70 includes the operation element 100 to be operated by the rider, and the main body 101 holding the operation element 100, and the attachment 102 to be attached to the vehicle body 5. The operation element 100 is attached so as to face downward, thereby enabling the rider to easily operate the auxiliary start switch 70 when the rider extends his/her hand to the auxiliary start switch 70 from above.

According to the first embodiment to which the present invention is applied, the motorcycle 1 includes the engine 10 mounted on the vehicle body 5, the starter motor 80 for starting the engine 10, and the operation part of the starter motor 80, wherein the operation part includes the engine start switch 67 provided on a handlebar 14 to permit a rider to steer the motorcycle 1, and the auxiliary start switch 70 provided on the vehicle body 5 side. This enables the rider to operate whichever of the engine start switch 67 and the auxiliary start switch 70 he/she can more easily operate in accordance with the conditions, so that the engine 10 can be restarted quickly.

The handlebar 14 includes the clutch lever 64a for engaging and disengaging transmission of driving force of the engine 10, and both of the clutch lever 64a and the auxiliary start switch 70 are operable simultaneously by the rider, so that the rider operates both of the clutch lever 64a and the auxiliary start switch 70 simultaneously when starting the engine 10, thereby enabling the engine 10 to be easily started.

Furthermore, the clutch lever 64a and the auxiliary start switch 70 are disposed separately on the left side and the right side of the vehicle body 5, and accordingly the rider can use his/her left and right hands to operate the clutch lever 64a and the auxiliary start switch 70, respectively, so that the operability is excellent.

The auxiliary start switch 70 is disposed inside the shroud 50 being the outer surface portion of the vehicle body 5 in the vehicle width direction, so that the auxiliary start switch 70 can be protected by the shroud 50, thereby capable of preventing mud and the like from adhering to the auxiliary start switch 70. Accordingly, the operability of the auxiliary start switch 70 is excellent.

The auxiliary start switch 70 and the engine start switch 67 are disposed at the respective positions which the hands of the rider sitting on the seat 13 can reach, so that the operability of the auxiliary start switch 70 and the engine start switch 67 is excellent.

Second Embodiment

Hereinafter, a second embodiment to which the present invention is applied will be described with reference to FIG. 8 to FIG. 10. In the second embodiment, portions configured to be the same as those in the first embodiment will be omitted from the description with the same signs given.

The second embodiment is different from the first embodiment in that, for example, an auxiliary start switch 270 (operation part, vehicle body side operation switch) is attached to a seat frame 25.

Figure 8:
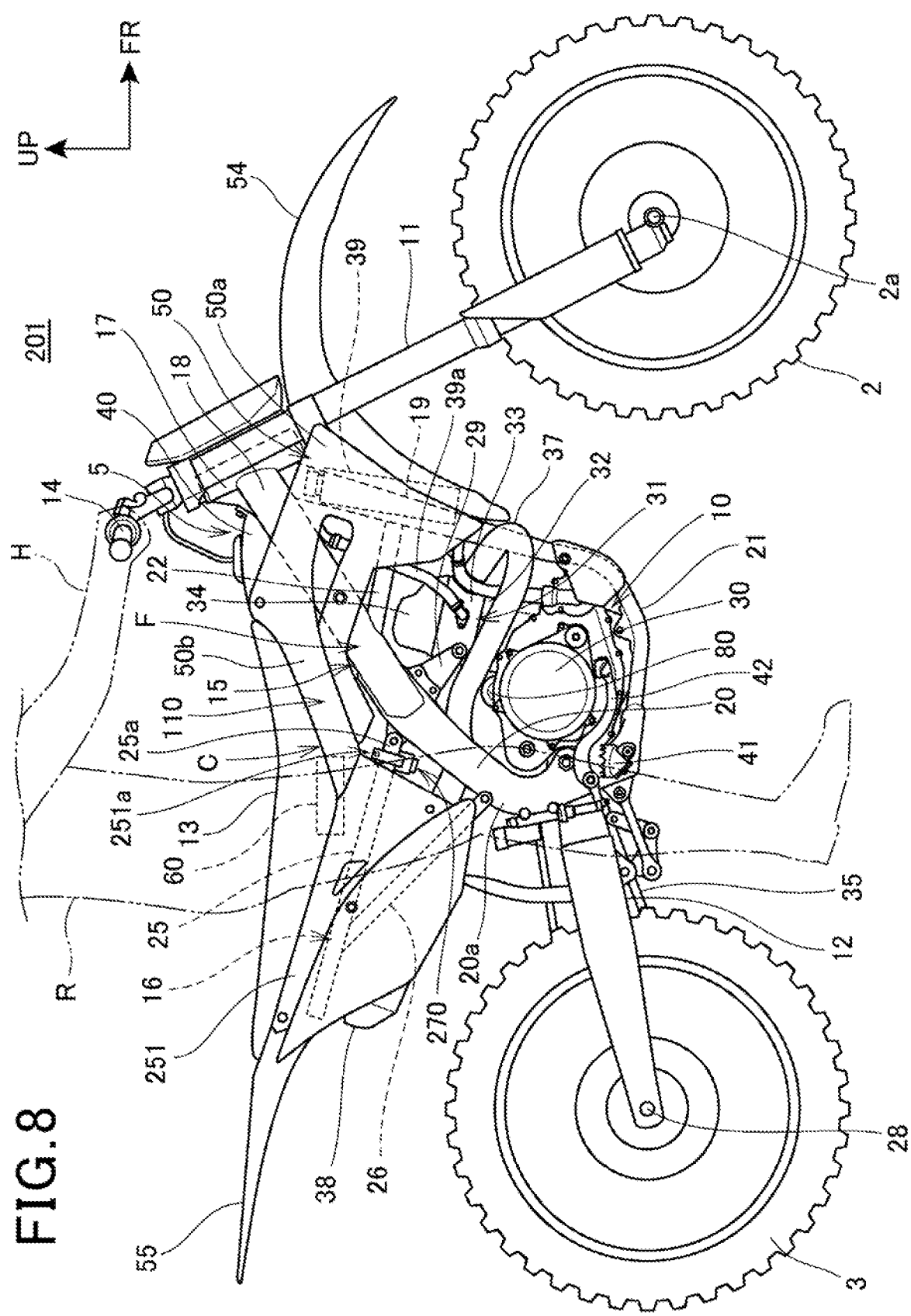
FIG. 8 is a right side view of a motorcycle of a second embodiment.

FIG. 8 is a right side view of a motorcycle 201 of the second embodiment.

The motorcycle 201 (traveling vehicle) has the same structure as the motorcycle 1 of the first embodiment except for an arrangement structure of the auxiliary start switch 270.

The vehicle body cover C includes shrouds 50, 50, and a pair of left and right rear side covers 251, 251 that are located in a vicinity of a seat 30. Each of the rear side covers 251, 251 is located below the rear portion of the seat 13 and behind a front frame 15, and covers the rear frame 16 including the seat frame 25 and a muffler 38 from the outside.

Figure 9:
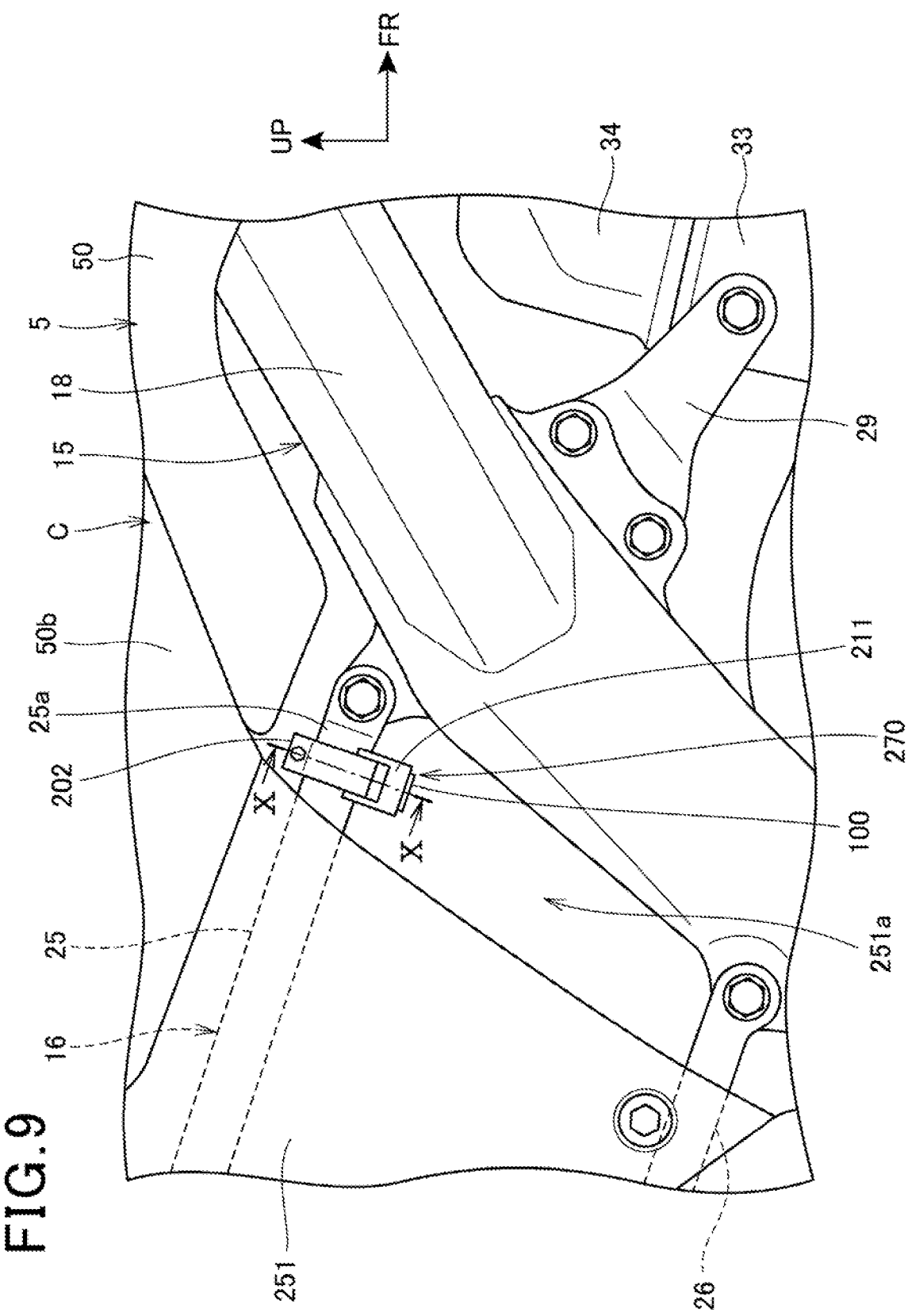
FIG. 9 is a right side view illustrating a front portion of a right-side rear side cover and a periphery thereof

FIG. 9 is a right side view illustrating a front portion of a right-side rear side cover 251 and a periphery thereof.

As illustrated in FIG. 8 and FIG. 9, the rear side cover 251 (cover member) is provided with an opening 251a at a front end of the rear side cover 251, the opening 251a being opened to a side. The opening 251a is provided to be continuously connected with rear edges of a main frame 18 and a center frame 20, and a front end portion 25a of the right side seat frame 25 is exposed outward from the opening 251a.

The auxiliary start switch 270 is attached to the front end portion 25a of the seat frame 25 on one side (right side) in the vehicle width direction, and is exposed outward from the opening 251a. That is, the auxiliary start switch 270 is a vehicle body side operation switch that is attached to the vehicle body 5.

Specifically, the auxiliary start switch 270 is disposed below the front portion of the seat 13 and above the center frame 20, and is located in the vicinity of the seat 13. The auxiliary start switch 270 is located between the center frame 20 and the sub-frame 26 and ahead of a rear end 20a of the center frame 20.

The auxiliary start switch 270 is disposed, instead of the auxiliary start switch 70, in the circuit of FIG. 3.

Figure 10:
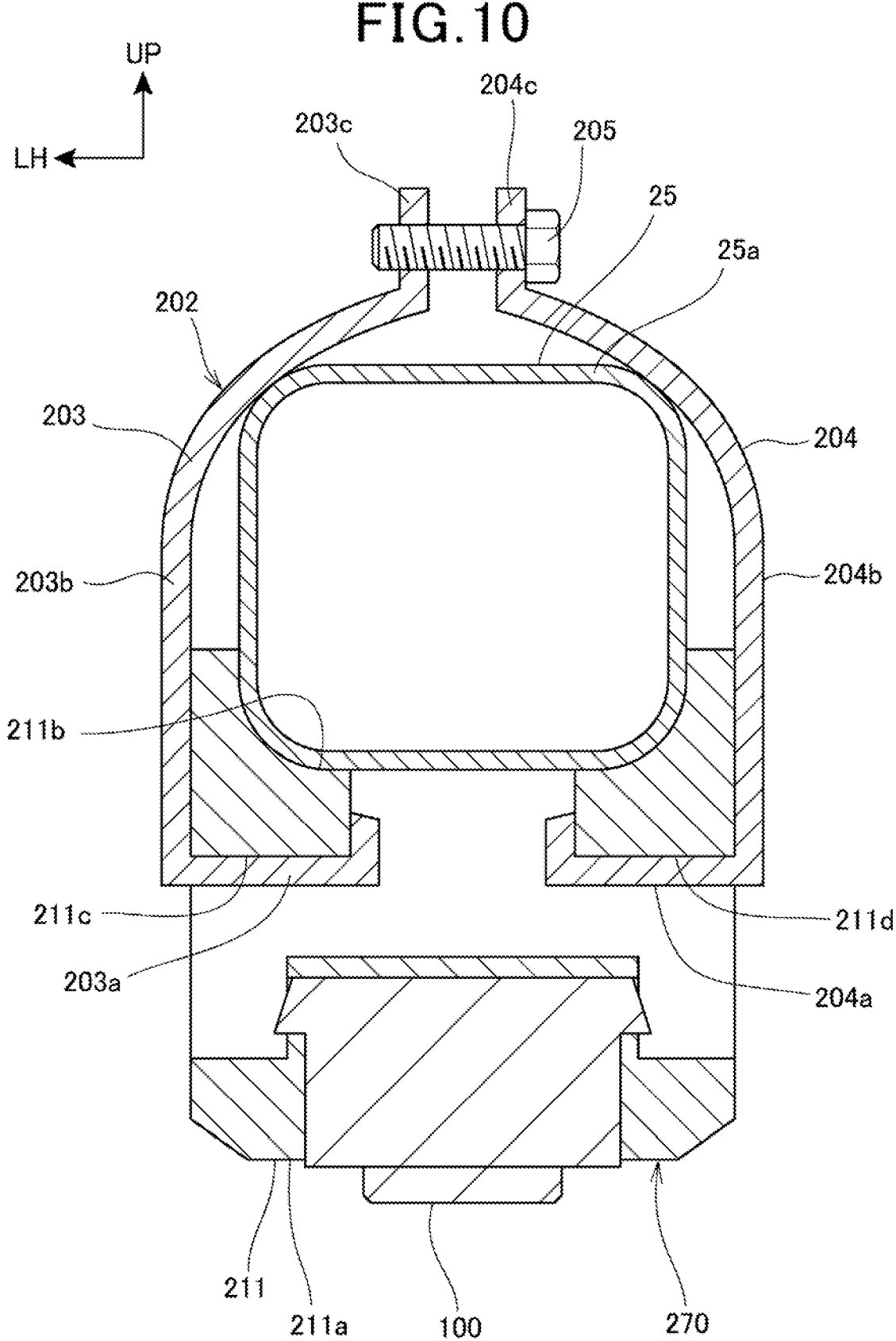
FIG. 10 is a cross-sectional view taken along line X-X of FIG. 9.

FIG. 10 is a cross-sectional view taken along line X-X of FIG. 9.

The seat frame 25 is a square pipe having a cross section formed in a nearly square (rectangular) shape.

The auxiliary start switch 270 includes an operation element 100, a main body 211 holding the operation element 100, and an attachment 202 fixing the main body 211 to the seat frame 25.

As illustrated in FIG. 10, the main body 211 is formed in a substantially box shape, and is provided with the operation element 100 in a lower surface 211a of the main body 211. The main body 211 has an upper surface 211b that is in contact with and is fixed to the lower portion of the reinforcement frame 22 of the seat frame 25, and the upper surface 211b is recessed downward so that a lower portion of the reinforcement frame 22 is fitted therein.

The main body 211 has side openings 211c, 211d for engaging with the attachment 202, the side openings 211c, 211d being provided in an inner side surface and an outer side surface of the main body 211, respectively, in the vehicle width direction.

The operation element 100 is a press button, and the auxiliary start switch 270 is in the conducting state only while the operation element 100 is pressed by the rider. The operation element 100 faces downward, and accordingly is pressed in an upward direction.

The attachment 202 is a fixture including an inner band 203 provided on an inner side surface of the main body 211 in the vehicle width direction, an outer band 204 provided on an outer side surface of the main body 211 in the vehicle width direction, and a fixing bolt 205 by which upper ends of the inner band 203 and the outer band 204 are connected to one another.

The inner band 203 includes a claw portion 203a engaged into the side opening 211c in the inner side surface, a band portion 203b extending upward from the seat frame 25 and toward the center of the seat frame 25 in the vehicle width direction along the inner side surface of the main body 211 and the upper inner side surface of the seat frame 25 from the claw portion 203a, and a flange portion 203c being bent and extending upward from the upper end of the band portion 203b.

The outer band 204 includes a claw portion 204a engaged into the side opening 211d in the outer side surface, a band portion 204b extending upward from the seat frame 25 and toward the center of the seat frame 25 in the vehicle width direction along the outer side surface of the main body 211 and the upper outer side surface of the seat frame 25 from the claw portion 204a, and a flange portion 204c being bent and extending upward from the upper end of the band portion 204b.

The upper portions of the band portions 203b, 204b are formed in a circular-arc shape along the left and right curved corner portions of the upper portion of the seat frame 25.

The auxiliary start switch 270 is fixed so as to hold the main body 211 and the seat frame 25 by a tightening force of the attachment 202 generated by fastening the flange portions 203c, 204c with a fixing bolt 205.

As illustrated in FIG. 8, a rider R who attempts to start the engine 10 operates the clutch lever 64a (FIG. 2) with his/her left hand, and operates the engine start switch 67 (FIG. 2) or the auxiliary start switch 270 with his/her right hand H.

The engine start switch 67 and the auxiliary start switch 270 are within reach of the right hand H of the rider R who is sitting on the seat 13.

The auxiliary start switch 270 is provided to the seat frame 25 supporting the seat 13 from below, so that the hand of the rider sitting on the seat 13 can easily reach the auxiliary start switch 270. The rider R operates the auxiliary start switch 270 through the opening 251a.

The auxiliary start switch 270 is disposed inside the main frame 18, the center frame 20, and the rear side cover 251 in the vehicle width direction, thereby capable of preventing mud and the like from adhering to the auxiliary start switch 270 and preventing the auxiliary start switch 270 from being damaged due to external forces. Therefore, the auxiliary start switch 270 can be operated to restart the engine 10 quickly.

The operation element 100 of the auxiliary start switch 270 is provided so as to face downward, and accordingly the rider R sitting on the seat 13 can operate the operation element 100 by inserting his/her fingers below the operation element 100 when extending his/her right hand H downward to operate the operation element 100, so that the operability is excellent.

In the vehicle body 5, a portion from a front portion of a rear side cover 251 to the shroud portion 50a in the front-rear direction is a knee grip portion 110 being sandwiched and held between the leg portions including knees by the rider R while driving the motorcycle 201.

The auxiliary start switch 270 is provided in the region of the knee grip portion 110. While driving the motorcycle 201, the legs of the rider R overlap with the auxiliary start switch 270 as viewed from the outside, thereby capable of preventing mud and the like from adhering to the auxiliary start switch 270 and preventing the auxiliary start switch 270 from being damaged.

As described above, according to the second embodiment to which the present invention is applied, the vehicle body 5 includes the main frame 18 that extends rearward from the head pipe 17 turnably supporting the handlebar 14, and the seat frame 25 that is disposed rearward from the main frame 18, and the auxiliary start switch 270 is attached to the seat frame 25. This enables the auxiliary start switch 270 to be attached by a simple structure, using the seat frame 25 without using a special bracket or the like.

Furthermore, the clutch lever 64a and the auxiliary start switch 270 are disposed separately on the left side and the right side of the vehicle body 5, and accordingly the rider can use his/her left and right hands to operate the clutch lever 64a and the auxiliary start switch 270, respectively, so that the operability is excellent.

Third Embodiment

Hereinafter, a third embodiment to which the present invention is applied will be described with reference to FIG. 11 and FIG. 12. In the third embodiment, portions configured to be the same as those in the first embodiment will be omitted from the description with the same signs given.

The third embodiment is different from the first embodiment in that an auxiliary start switch 370 (operation part, vehicle body side operation switch) is disposed in an opening 320d in a side cover 50b (cover member).

Figure 11:
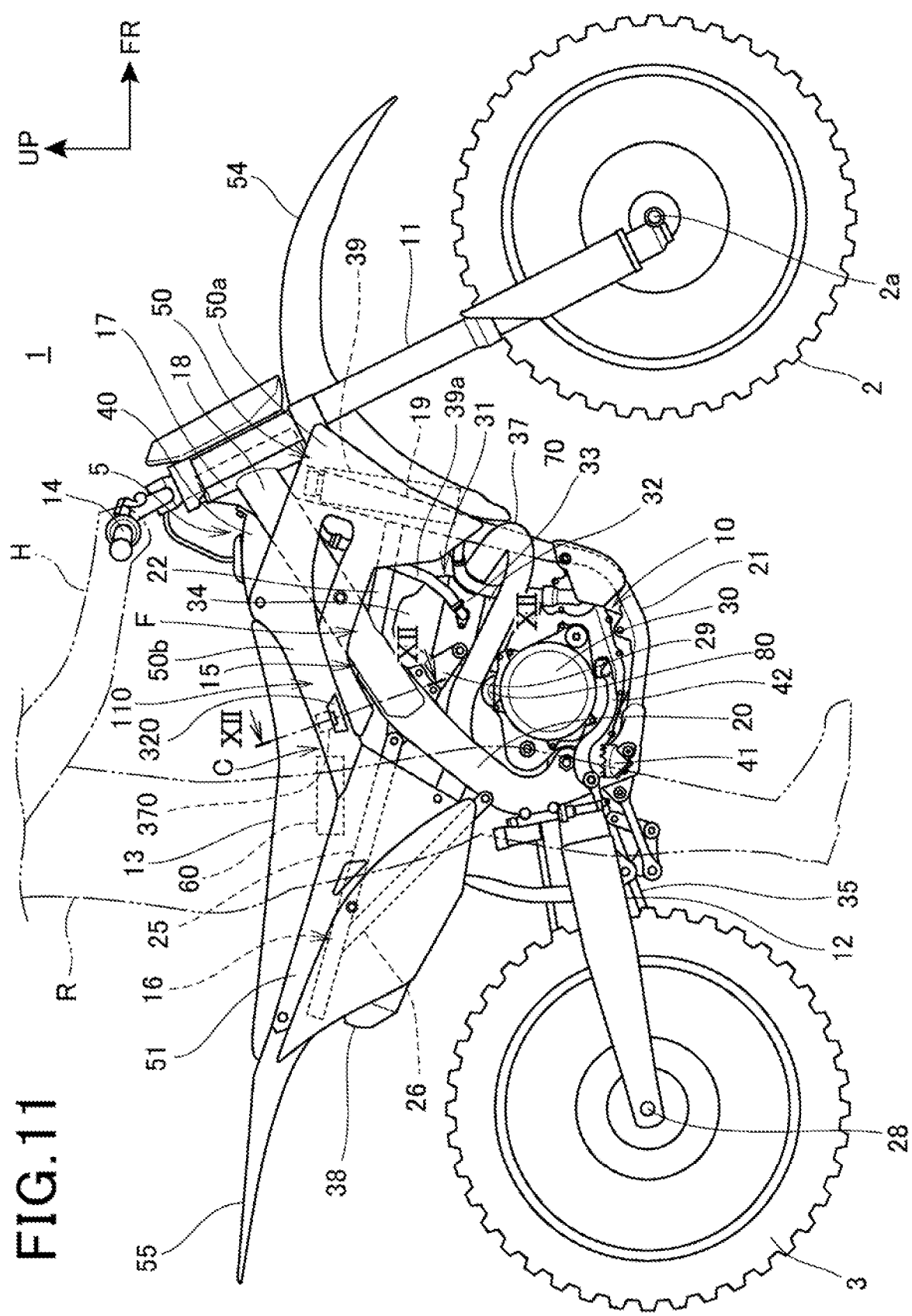
FIG. 11 is a right side view of a motorcycle of a third embodiment.

FIG. 11 is a right side view of a motorcycle 301 of the third embodiment.

The motorcycle 301 (traveling vehicle) has the same structure as the motorcycle 1 of the first embodiment except for an arrangement structure of the auxiliary start switch 370.

The motorcycle 301 includes the auxiliary start switch 370 for operating the starter motor 80 (FIG. 3). The auxiliary start switch 370 is disposed, instead of the auxiliary start switch 70, in the circuit of FIG. 3.

The auxiliary start switch 370 is disposed inside the side cover 50b of the shroud 50 on one side (right side) in the vehicle width direction.

Figure 12:
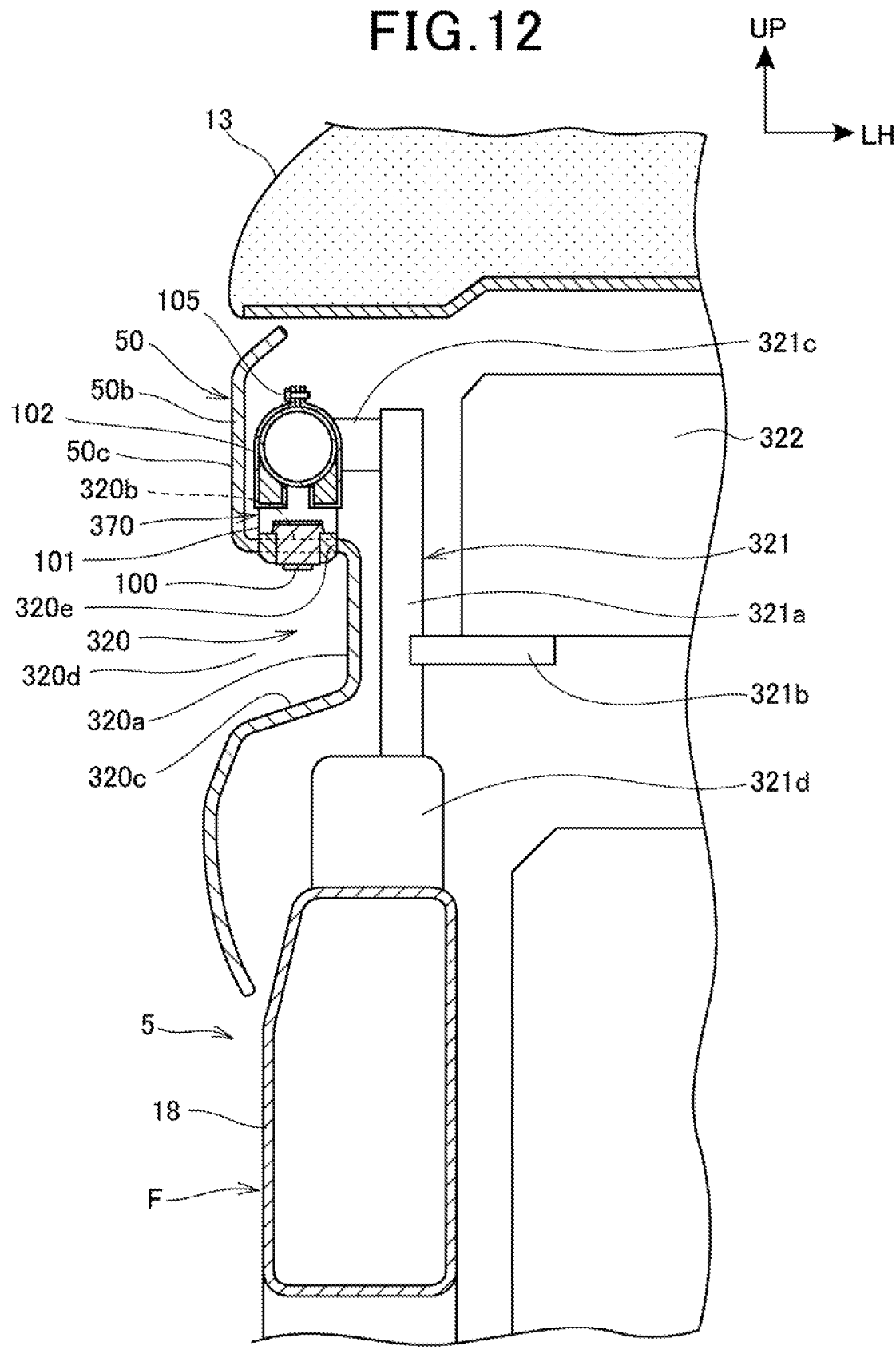
FIG. 12 is a cross-sectional view taken along line XII-XII of FIG. 11.

FIG. 12 is a cross-sectional view taken along line XII-XII of FIG. 11.

As illustrated in FIG. 11 and FIG. 12, the side cover 50b is located in the vicinity of the seat 13, and is a plate-shaped outer surface cover that covers a portion between the rear portion of the main frame 18 and the front portion of the seat 13 from the outside. The side cover 50b is located ahead of the seat frame 25.

The side cover 50b includes a recess 320 recessed inward from an outer side surface 50c in the vehicle width direction. The recess 320 is formed in a middle portion of the side cover 50b in the up-down direction.

The recess 320 includes a recessed inner wall 320a forming an inner side surface of the recess 320 in the vehicle width direction. This recessed inner wall 320a is a bottom surface of the recess 320. The recess 320 includes a recessed upper wall 320b connecting between an upper edge of the recessed inner wall 320a and the outer side surface 50c, a recessed lower wall 320c connecting between a lower edge of the recessed inner wall 320a and the outer side surface 50c, and an opening 320d in which an inner space of the recess 320 is opened outward.

The motorcycle 301 includes a bracket 321 that is located above the rear portion of the main frame 18. The bracket 321 is fixed to the vehicle body frame F, and forms a part of the vehicle body 5.

The bracket 321 includes a pillar 321a extending upward between the main frame 18 and the seat 13 through a mounting seat 321d, an air cleaner stay 321b extending inward from the pillar 321a in the vehicle width direction, and a switch stay 321c disposed above the air cleaner stay 321b and extending outward from the pillar 321a in the vehicle width direction.

An air cleaner box 322 for cleaning intake air of the engine 10 is supported by the air cleaner stay 321b. The air cleaner box 322 is disposed between the left and right side covers 50b, 50b, and is covered by the seat 13 from above.

The auxiliary start switch 370 is supported on the switch stay 321c of the bracket 321, and is located outside the pillar 321a in the vehicle width direction. That is, the auxiliary start switch 370 is provided in the vehicle body 5 through the bracket 321.

The bracket 321 and the auxiliary start switch 370 are located between the side cover 50b and the air cleaner box 322, and are covered by the side cover 50b from the outside. The auxiliary start switch 370 is located above the recess 320.

The auxiliary start switch 370 includes the operation element 100 (also see FIG. 7), a main body 101 (also see FIG. 7), and an attachment 102 (also see FIG. 7). The auxiliary start switch 370 is attached below the switch stay 321c by the attachment 102 in a state in which an upper surface of the main body 101 is in contact with the switch stay 321c. The operation element 100 in the lower surface of the main body 101 is provided so as to face downward, and accordingly is pressed in an upward direction.

The recessed upper wall 320b of the recess 320 includes a switch hole 320e which passes through the recessed upper wall 320b in the up-down direction. A lower portion of the auxiliary start switch 370 attached above the recessed upper wall 320b is inserted into the switch hole 320e from above, so that the operation element 100 is exposed into the recess 320 from the switch hole 320e. That is, the operation element 100 of the auxiliary start switch 370 is provided in the recess 320, and accordingly the rider accesses the operation element 100 through the opening 320d to be able to operate the operation element 100.

As illustrated FIG. 11, a rider R who attempts to start the engine 10 operates the clutch lever 64a (FIG. 2) with his/her left hand, and operates the engine start switch 67 (FIG. 2) or the auxiliary start switch 370 with his/her right hand H.

The engine start switch 67 and the auxiliary start switch 370 are within reach of the right hand H of the rider R who is sitting on the seat 13.

The auxiliary start switch 370 is provided to the recess 320 of the side cover 50b continuously provided with the seat 13, and is located in the vicinity of the seat 13, so that the hand of the rider R sitting on the seat 13 can easily reach the auxiliary start switch 370.

The auxiliary start switch 370 is disposed inside the outer side surface 50c of the side cover 50b in the vehicle width direction and far inside of the recess 320, thereby making it difficult for mud and the like to adhere to the auxiliary start switch 370 and difficult for the auxiliary start switch 370 to be damaged due to external forces. Therefore, the auxiliary start switch 370 can be operated to restart the engine 10 quickly.

The operation element 100 of the auxiliary start switch 370 is provided so as to face downward, and accordingly the rider R sitting on the seat 13 can operate the operation element 100 by inserting his/her fingers below the operation element 100 when extending his/her right hand H downward to operate the operation element 100, so that the operability is excellent.

In the vehicle body 5, a portion from a front portion of the rear side cover 51 to the shroud portion 50a in the front-rear direction is a knee grip portion 110 being sandwiched and held between the leg portions including knees by the rider R while driving the motorcycle 301.

The auxiliary start switch 370 is provided in the region of the knee grip portion 110. While driving the motorcycle 301, the legs of the rider R overlap with the auxiliary start switch 370 as viewed from the outside, thereby capable of preventing mud and the like from adhering to the auxiliary start switch 370 and preventing the auxiliary start switch 370 from being damaged.

As described above, according to the third embodiment to which the present invention is applied, the side cover 50b of the side surface of the vehicle body 5 has the opening 320d which is opened to a side of the side cover 50b, and the auxiliary start switch 370 is disposed so as to be operable through the opening 320d, which makes it difficult for dirt and the like to adhere to the auxiliary start switch 370. The auxiliary start switch 370 in the opening 320d is hardly visible from the outside, so that the appearance is excellent.

Furthermore, the clutch lever 64a and the auxiliary start switch 370 are disposed separately on the left side and the right side of the vehicle body 5, and accordingly the rider can use his/her left and right hands to operate the clutch lever 64a and the auxiliary start switch 370, respectively, so that the operability is excellent.

Note that the above embodiments show embodiments to which the present invention is applied, and the present invention is not limited to the above embodiments.

The above first to three embodiments have made an explanation by raising an example of an all-terrain vehicle for competition as a traveling vehicle to which the present invention is applied, but the present invention is not limited to these embodiments, and the present invention is applicable to a saddle riding vehicle such as a motorcycle that can travel on a general public road and an off-road, a saddle riding vehicle such as an on-road motorcycle, a three-wheeled saddle riding vehicle having either two front wheels or two rear wheels, and a saddle riding vehicle such as a three-wheeled or four-or-more wheeled buggy, and a scooter.

The above first to three embodiments have made an explanation by raising an example of the engine 10 being an internal combustion engine as a power generation part started by a starting device, but the present invention is not limited to these embodiments, and for example, the power generation part may be an electric motor as a driving source of an electric vehicle, and an electric motor of a vehicle powered by fuel cells. The structure of the present invention may be applied to operation parts for a rider which is provided for starting these power generation parts.

The above third embodiment has made an explanation by raising an example of the structure in which an auxiliary start switch 370 is provided to be operable through an opening 320d, but the present invention is not limited to this embodiment, and for example, the structure may be adopted in which a lid for closing the opening 320d is provided, the lid being openably/closably provided, and the lid is opened to operate the auxiliary start switch 370.

REFERENCE SIGNS LIST 1, 201, 301 Motorcycle (traveling vehicle)
5 Vehicle body
10 Engine (power generation part)
13 Seat (seating part)
14 Handlebar (handlebar part)
17 Head pipe
18 Main frame
19 Down frame
22 Reinforcement frame 25 Seat frame
39 Radiator (cooling device)
50 Shroud (cover member)
50b Side cover (cover member)
64a Clutch lever (clutch operation element)
67 Engine start switch (operation part, handlebar side operation switch)
70, 270, 370 Auxiliary start switch (operation part, vehicle body side operation switch)
80 Starter motor (starting device)
100 Operation element
101, 211 Main body
102, 202 Attachment
107 Rear-side opening
251 Rear side cover (cover member)
320d Opening

The invention claimed is:

1. A saddle riding vehicle, comprising:
a power generation part mounted on a vehicle body;
a starting device for starting the power generation part; and
an operation part of the starting device, wherein
the operation part includes a handlebar side operation switch provided on a handlebar, and a vehicle body side operation switch provided on the vehicle body side,
the vehicle body side operation switch is disposed inside the vehicle in a width direction,
the vehicle body includes a vehicle body frame provided with a head pipe at a front end of the vehicle body frame, the head pipe turnably supporting the handle bar, and
the vehicle body side operation switch is attached to the vehicle frame.

2. The saddle riding vehicle according to claim 1, wherein the vehicle body side operation switch is disposed inside a cover member of an outer surface portion of the vehicle body in the width direction.

3. The saddle riding vehicle according to claim 2, wherein the vehicle body side operation switch is located in a vicinity of a seat of the rider.

4. The saddle riding vehicle according to claim 2, wherein the cover member is a shroud provided on a side of a cooling device of the power generation part, and
the vehicle body side operation switch is disposed in a rear-side opening that is opened at a rear side of the shroud.

5. The saddle riding vehicle according to claim 1, wherein
the vehicle body includes: a main frame that extends rearward from the head pipe; a down frame that extends below the main frame toward a rear side of the head pipe; and a reinforcement frame which connects between the down frame and the main frame in a front-rear direction, and
the vehicle body side operation switch is attached to the reinforcement frame.

6. The saddle riding vehicle according to claim 1, wherein
the vehicle body includes: a main frame that extends rearward from the head pipe; and a seat frame that is disposed on a rear side of the main frame, and
the vehicle body side operation switch is attached to the seat frame.

7. The saddle riding vehicle according to claim 1, wherein
the vehicle body includes a cover member having an opening which is opened in a side of the cover member, and
the vehicle body side operation switch is disposed so as to be operated through the opening.

8. A saddle riding vehicle according to claim 1, wherein:
the vehicle body side operation switch includes: an operation element, a main body holding the operation element; and an attachment to be attached to the vehicle body, and
the operation element is attached so as to face downward.

9. The saddle riding vehicle according to claim 1, wherein
the handlebar includes a clutch operation element for engaging and disengaging transmission of driving force of the power generation part, and
both of the clutch operation element and the vehicle body side operation switch are operable simultaneously.

10. The saddle riding vehicle according to claim 9, wherein
the clutch operation element and the vehicle body side operation switch are disposed separately on a left side and a right side of the vehicle body.

11. The saddle riding vehicle according to claim 1, wherein
the vehicle body side operation switch and the handlebar side operation switch are disposed at respective positions.

12. A traveling vehicle, comprising:
a power generation part mounted on a vehicle body;
a starting device for starting the power generation part; and
an operation part of the starting device, wherein
the operation part includes a handlebar side operation switch provided on a handlebar, and a vehicle body side operation switch provided on the vehicle body side,
the vehicle body side operation switch is disposed inside the vehicle in a vehicle width direction,
the vehicle body includes a cover member, and the vehicle body side operation switch is disposed inside an outer surface portion of the cover member in the vehicle width direction,
the cover member is a shroud provided on a side of a cooling device of the power generation part, and the vehicle body side operation switch is disposed in a rear-side opening that is opened at a rear side of the shroud.

* * * * *